(12) United States Patent
Iwasawa et al.

(10) Patent No.: US 10,545,321 B2
(45) Date of Patent: Jan. 28, 2020

(54) ZOOM LENS AND CAMERA DEVICE

(71) Applicant: TAMRON CO., LTD., Saitama-shi, Saitama (JP)

(72) Inventors: Yoshito Iwasawa, Tokyo (JP); Jun Takahashi, Ashigarakami-gun (JP)

(73) Assignee: TAMRON CO., LTD., Saitama-shi (JP)

( * ) Notice: Subject to any disclaimer, the term of this patent is extended or adjusted under 35 U.S.C. 154(b) by 151 days.

(21) Appl. No.: 15/364,590

(22) Filed: Nov. 30, 2016

(65) Prior Publication Data

US 2017/0082841 A1 Mar. 23, 2017

Related U.S. Application Data

(63) Continuation of application No. 14/141,011, filed on Dec. 26, 2013.

(30) Foreign Application Priority Data

Dec. 27, 2012 (JP) .................. 2012-286012

(51) Int. Cl.
 *G02B 15/173* (2006.01)
 *G02B 27/64* (2006.01)
 (Continued)

(52) U.S. Cl.
 CPC ........... *G02B 15/173* (2013.01); *G02B 5/005* (2013.01); *G02B 27/0025* (2013.01); *G02B 27/646* (2013.01)

(58) Field of Classification Search
 CPC ........ G02B 9/12–32; G02B 9/34; G02B 9/60; G02B 9/62; G02B 9/64; G02B 13/009;
 (Continued)

(56) References Cited

U.S. PATENT DOCUMENTS 4,478,496 A 10/1984 Kato
6,025,962 A 2/2000 Suzuki
(Continued)

FOREIGN PATENT DOCUMENTS

CN 102103253 A 6/2011
CN 102798965 A 11/2012
(Continued)

OTHER PUBLICATIONS

Non-Final Office Action dated Mar. 7, 2017, issued in U.S. Appl. No. 15/364,588 (17 pages).
(Continued)

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

A zoom lens has in order from the object side, at least a foremost, first lens group having positive refractive power, a succeeding, second lens group having negative refractive power, a third lens group having positive refractive power, and a rearmost lens group having negative refractive power. The zoom lens meets requirements as defined in formulas regarding a displacement of the first lens group, a focal length of the zoom lens at the wide-angle end, a focal length of the zoom lens at the telephoto end, a focal length of the first lens group, and a focal length of the third lens group.

12 Claims, 21 Drawing Sheets

(51) Int. Cl.
*G02B 5/00* (2006.01)
*G02B 27/00* (2006.01)

(58) Field of Classification Search
CPC ............. G02B 15/00; G02B 15/14–16; G02B 15/173; G02B 27/0025; G02B 27/64; G02B 27/646; G02B 5/005; H04N 5/23248; H04N 5/23254; H04N 5/23258; H04N 5/23264; H04N 5/2328; H04N 5/23287; G03B 2205/0007; G03B 2205/0015; G03B 5/00; G03B 5/02; G03B 5/04; G03B 5/06
USPC ....... 359/554, 557, 676, 683, 689, 690, 763, 359/764, 771, 772, 773, 784–788; 348/208.99; 396/52, 55
See application file for complete search history.

(56) References Cited

U.S. PATENT DOCUMENTS

| | | |
|---|---|---|
| 6,618,197 B1 | 9/2003 | Hayakawa |
| 7,433,584 B2 | 10/2008 | Masui et al. |
| 7,535,654 B2 | 5/2009 | Ohashi |
| 7,630,138 B2 | 12/2009 | On |
| 7,630,141 B2 | 12/2009 | Saruwatari |
| 7,995,284 B2 | 8/2011 | Matsui |
| 8,982,477 B2 | 3/2015 | Wada |
| 9,140,905 B2 | 9/2015 | Misaka |
| 2005/0219708 A1 | 10/2005 | Shibayama et al. |
| 2006/0221464 A1 | 10/2006 | Shibayama et al. |
| 2007/0058268 A1 | 3/2007 | Terada |
| 2007/0229974 A1 | 10/2007 | Shibayama et al. |
| 2008/0285150 A1 | 11/2008 | Souma |
| 2009/0284847 A1 | 11/2009 | Ishibashi |
| 2010/0220400 A1 | 9/2010 | Yamamoto et al. |
| 2010/0271710 A1 | 10/2010 | Ohashi |
| 2011/0102905 A1 | 5/2011 | Harada |
| 2011/0116174 A1 | 5/2011 | Suzuki et al. |
| 2011/0176224 A1* | 7/2011 | Sato ................. G02B 15/173 359/683 |
| 2011/0188117 A1 | 8/2011 | Arakawa et al. |
| 2012/0026602 A1 | 2/2012 | Uchida et al. |
| 2012/0057234 A1 | 4/2012 | Li |
| 2012/0293872 A1 | 11/2012 | Katayose et al. |

FOREIGN PATENT DOCUMENTS

| | | |
|---|---|---|
| EP | 1975668 A2 | 10/2008 |
| JP | 2005-284097 A | 10/2005 |
| JP | 2008-26837 A | 2/2008 |
| JP | 2010-019945 A | 1/2010 |
| JP | 2010-175899 A | 8/2010 |
| JP | 2011-099925 A | 5/2011 |
| JP | 2011-158630 A | 8/2011 |
| JP | 2011-248220 A | 12/2011 |
| JP | 2012-053444 A | 3/2012 |
| JP | 2012-208434 A | 10/2012 |
| KR | 10-2012-0070491 A | 6/2012 |

OTHER PUBLICATIONS

Final Office Action dated Mar. 24, 2017, issued in U.S. Appl. No. 14/414,011 (21 pages).
Office Action dated Oct. 24, 2016, issued in counterpart Japanese Patent Application No. 2012-286012. (8 pages).
Chinese Office Action dated Dec. 21, 2015, issued in counterpart Chinese Patent Application No. 201310726394.4. (5 pages).
Notice of Allowance dated May 18, 2018, issued in U.S. Appl. No. 15/364,588 (8 pages).

* cited by examiner

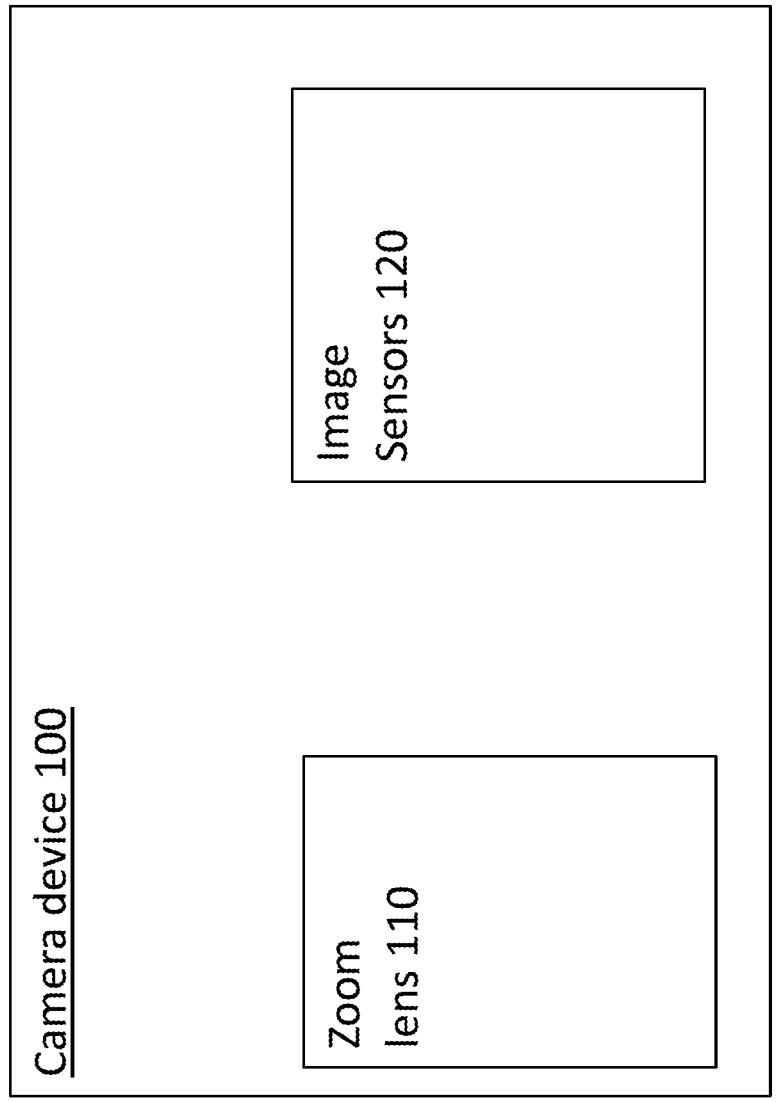

ZOOM LENS AND CAMERA DEVICE

CROSS-REFERENCE TO RELATED APPLICATIONS

The present patent application is a continuation of application Ser. No. 14/141,011, filed Dec. 26, 2013, which claims priority from Japanese Application No. 2012-286012, filed Dec. 27, 2012, which are incorporated herein by reference in their entireties.

FIELD OF THE INVENTION

The present invention relates to zoom lenses, interchangeable lens units incorporating the zoom lenses, and camera devices used with the same. More particularly, the present invention relates to high variable power compact zoom lenses suitable to camera optical systems for digitized signal input/output devices such as digital still cameras, digital video cameras, and the like, interchangeable lens units incorporating the zoom lenses, and camera devices used with the same.

BACKGROUND ART

Recently, camera devices, such as digital still cameras, incorporating solid-state image sensors have been popular. This tendency of the market demand has been followed by the performance improvement and downsizing of optical systems, and more compact camera systems have rapidly become commercially available. Optical systems in such camera systems are of higher-performance oriented and increasingly downsizing oriented design to meet the market demands for zoom lens optical systems with a shortened entire length and for lens barrels with a reduced diameter. Especially, it is highly desired that optical systems, such as tele-photographing zoom lenses, having an increased focal length should be of more enhanced performance and reduced dimensions.

One prior art highly variable power compact zoom lens, which satisfies the demands of higher-performance and reduced dimensions, comprises the foremost or first lens group G1 of positive refractive power located the closest to an object, the succeeding or second lens group G2 of negative refractive power, the third lens group G3 of positive refractive power, and the fourth lens group L4 of positive refractive power located the closest to the imaging plane, and such a prior art zoom lens meets the requirements as defined in the following formula:

$12 < Lt/(Ft/Fw) < 15$ where Lt is an entire length of the optical system (a distance from the front surface of the front lens piece the closest to the object to the imaging plane) when the zoom lens is taking a telephoto position, Ft is a focal length of the optical system as a whole when the zoom lens is taking a telephoto position, and Fw is a focal length of the optical system as a whole when the zoom lens is taking a wide-angle position (e.g., see Patent Document 1 listed below).

LIST OF DOCUMENTS OF THE RELATED ART

Patent Document 1
Official Gazette of JP-A-2011-248220

The prior art highly variable power compact zoom lens mentioned above has its lens group of negative refractive power deviated/displaced in directions normal to the optical axis to serve as an anti-vibration lens, which is intended to downsize the lens barrel by downsizing the anti-vibration lens in a diametral dimension. Due to a great displacement of the first lens group, however, the cam mechanism in the lens barrel is unavoidably so complicated as recognized in multi-stage cam design, and the resultant zoom lens is still unsatisfactory in that the lens barrel is not sufficiently downsized.

Allowing for the aforementioned disadvantages in the prior art highly variable power compact zoom lens, the present invention is directed to providing an improved zoom lens that attains high-performance imaging suitable to changeable lenses and/or camera devices incorporating solid-state image sensors, such as digital still cameras, digital video cameras, and the like, of which pixels are much more minute than those of photographing film, and providing an improved camera device used with such a zoom lens.

The present invention is also directed to providing an improved zoom lens in which a displacement of a lens group(s) moved to vary magnification is reduced so as to reduce a diametral dimension of the lens barrel and simplify a barrel structure, and also, in which a lens group(s) of negative refractive power serve as an anti-vibration lens to attain the same object, namely to reduce the diametral dimension of the lens barrel.

SUMMARY OF THE INVENTION

A first zoom lens in accordance with the present invention comprises three or more groups of lens pieces, the foremost or first lens group of positive refractive power located the closest to an object, the succeeding second lens group of negative refractive power, and the third lens group of positive refractive power, all arranged in this order, and if any, the rearmost lens group(s) closer to the imaging plane than the third lens group, all or part of the lens group(s) of negative refractive power behind the third lens group being moved in directions normal to the optical axis to serve as an anti-vibration lens for shifting an image; and the zoom lens meets the requirements as defined in the following formula:

$$0.11 \leq X1/fT \leq 0.28 \tag{1}$$

$$0.5 \leq f1/\sqrt{(fw \times fT)} \leq 1.3 \tag{2}$$

$$0.20 \leq f3/\sqrt{(fw \times fT)} \leq 0.45 \tag{3}$$

where X1 is a displacement of the first lens group when the zoom lens is extended from the wide-angle position to the telephoto position to vary magnification, fw is a focal length of the zoom lens at the wide-angle position, fT is a focal length of the zoom lens at the telephoto position, f1 is a focal length of the first lens group, and f3 is a focal length of the third lens group.

A second zoom lens in accordance with the present invention comprises five or more groups of lens pieces, the foremost or first lens group of positive refractive power located the closest to an object, the succeeding second lens group of negative refractive power, the third lens group of positive refractive power, the fourth lens group, and the fifth lens group, all arranged in this order, all or part of the lens group(s) of negative refractive power behind the third lens group being moved in directions normal to the optical axis to serve as an anti-vibration lens for shifting an image; and the zoom lens meets the requirements as defined in the following formula:

$$0.11 \leq X1/fT \leq 0.28 \tag{1}$$

$$0.5 \leq f1/\sqrt{(fw \times fT)} \leq 1.3 \tag{2}$$

where X1 is a displacement of the first lens group when the zoom lens is extended from the wide-angle position to the telephoto position to vary magnification, fw is a focal length of the zoom lens at the wide-angle position, fT is a focal length of the zoom lens at the telephoto position, and f1 is a focal length of the first lens group.

A camera device in accordance with the present invention comprises image sensors disposed on or behind the imaging plane of any of the aforementioned zoom lenses according to the present invention, for converting an optical image created by the zoom lens into electrical signals.

In accordance with the present invention, the zoom lens attains high-performance imaging suitable to attachment lenses and/or camera devices incorporating solid-state image sensors, such as digital still cameras, digital video cameras, and the like, of which pixels are much more minute than those of photographing film, and the camera device is suitably used with such a zoom lens.

Moreover, in the zoom lens according to the present invention, a displacement of a lens group(s) moved to vary magnification is reduced so as to reduce a diametral dimension of the lens barrel and simplify a barrel structure, and also, the lens group(s) of negative refractive power serve as an anti-vibration lens to attain the same object, namely to reduce the diametral dimension of the lens barrel.

Furthermore, the zoom lens according to the present invention, which comprises at least three groups of lens pieces, namely, the foremost or first lens group of positive refractive power positioned the closest to an object, the second lens group of negative refractive power, and the third lens group of positive refractive power, and if any, the rearmost lens group(s) behind the third lens group, is capable of varying three or more dimensional components or distances between the lens groups adjacent to each other during varying its magnification so as to obtain an enhanced freedom to compensate for aberrations.

In a first aspect of the present invention, the first zoom lens meets the requirements as defined about the third lens group in the following formula (3):

$$0.20 \leq f3/\sqrt{(fw \times fT)} \leq 0.45 \quad (3)$$

where f3 is a focal length of the third lens group.

In a second aspect of the present invention, the first or second zoom lens of the present invention comprises a lens group(s) of positive refractive power and/or a component lens piece(s) of positive refractive power located closer to the object than all or part of the lens group(s) of negative refractive power moved to serve as an anti-vibration lens for shifting an image.

In a third aspect of the present invention, the first or second zoom lens of the present invention has one or more lens pieces of positive and negative refractive power in all or part of the lens group(s) of negative refractive power moved to serve as an anti-vibration lens for shifting an image.

In a fourth aspect of the present invention, the first or second zoom lens of the present invention is designed so that part or all of the lens group(s) moved to serve as an anti-vibration lens for shifting an image meet the requirements as defined in the following formula (4):

$$-2.8 \leq (1-\beta a) \times \beta b \leq -1.0 \quad (4)$$

where βa is a magnification of the lens group(s) movable in directions normal to the optical axis when the zoom lens is taking a telephoto position, and βb is a combined magnification of a lens group(s) closer to the imaging plane than the lens group(s) movable in directions normal to the optical axis.

In a fifth aspect of the present invention, the first or second zoom lens of the present invention is designed to meet the requirements as defined in the following formula (5):

$$0.60 \leq Lt/fT \leq 0.75 \quad (5)$$

where Lt is an entire length of the optical system of the zoom lens at the telephoto position, and fT is a focal length of the zoom lens at the telephoto position.

In a sixth aspect of the present invention, the first or second zoom lens of the present invention comprises two or more lens groups located behind the third lens group and moved to vary magnification.

The formula (1) defines the requirements for a displacement of the first lens group in the zoom lens during extending from the wide-angle position to the telephoto position.

When an actual value of X1/fT exceeds the upper limit defined in the formula (1), the displacement of the first lens group in the resultant zoom lens is increased, and this unavoidably brings about a complicated barrel design as recognized in a multi-stage lens barrel arrangement, which in turn hinders downsizing the lens barrel.

When an actual value of X1/fT is smaller than the lower limit defined in the formula (1), the resultant zoom lens has its optical system varied not so much in entire length between the telephoto position and the wide-angle position, but the entire length of the optical system at the wide-angle position is excessively great, which in turn brings about an increase in a diameter of the first lens group located the closest to the object as well as an increase of an entire longitudinal dimension of the lens barrel.

To obtain more significant effects, the formula (1) may desirably be modified as follows:

$$0.11 \leq X1/fT \leq 0.22 \quad (1')$$

To obtain much more significant effects, the formula (1) may desirably be modified as follows:

$$0.11 \leq X1/fT \leq 0.18 \quad (1'')$$

The formula (2) defines the requirements for a focal distance of the first lens group in the zoom lens.

When an actual value of f1/√(fw·fT) is smaller than the lower limit defined in the formula (2) to intensify the positive refractive power of the first lens group, the resultant zoom lens taking a telephoto position develops chromatic aberration so great as to cause a difficulty in compensating for it.

When an actual value of f1/√(fw·fT) exceeds the upper limit defined in the formula (1) to weaken the positive refractive power of the first lens group, a light beam incident upon the second lens group is not sufficiently converged, and this unavoidably brings about an increase in dimensions of the second lens group and an increase in a displacement of the first lens group, which in turn leads to an increase in dimensions of the lens barrel as a whole.

To obtain more significant effects, the formula (2) may desirably be modified as follows:

$$0.6 \leq f1/\sqrt{(fw \times fT)} \leq 1.2 \quad (2')$$

To obtain much more significant effects, the formula (2) may desirably be modified as follows:

$$0.7 \leq f1/\sqrt{(fw \times fT)} \leq 1.1 \quad (2'')$$

The formula (3) defines the requirements for a focal distance of the third lens group in the zoom lens.

When an actual value of f3/√(fw·fT) is smaller than the lower limit defined in the formula (3) to intensify the positive refractive power of the first lens group, the resultant zoom lens taking a telephoto position develops spherical aberration so great as to cause a difficulty in compensating for it.

When an actual value of f3/√(fw·fT) exceeds the upper limit defined in the formula (3) to weaken the positive refractive power of the first lens group, a light beam incident upon the lens group(s) or an anti-vibration lens behind the third lens group is not sufficiently converged, and this unavoidably brings about an increase in dimensions of the anti-vibration lens and an increase in dimensions of an anti-vibration lens unit, which in turn leads to an increase in dimensions of the lens barrel as a whole.

To obtain more significant effects, the formula (3) may desirably be modified as follows:

$$0.20 \leq f3/\sqrt{(fw \times fT)} \leq 0.40 \quad (3')$$

To obtain much more significant effects, the formula (3) may desirably be modified as follows:

$$0.20 \leq f3/\sqrt{(fw \times fT)} \leq 0.35 \quad (3'')$$

The formula (4) defines the requirements for a rate of a displacement of the lens group(s) movable in directions normal to the optical axis to an amount by which an image is shifted.

When an actual value of $(1-\beta a) \cdot \beta b$ is smaller than the lower limit defined in the formula (4), the resultant zoom lens adversely permits an image to shift greatly even with a minor displacement of the lens group(s) movable in directions normal to the optical axis or the anti-vibration lens, and thus, high-precision control of the anti-vibration lens is required.

When an actual value of $(1-\beta a) \cdot \beta b$ exceeds the upper limit defined in the formula (4), the resultant zoom lens has to have the anti-vibration lens displaced more in directions normal to the optical axis to shift the image by a predetermined amount, and for that purpose, a larger lens actuator system for driving the anti-vibration lens is needed, which hinders downsizing the lens barrel.

The formula (5) defines the requirements for dimensions of the optical system of the zoom lens at the telephoto position.

Fulfilling the conditions defined in the formula (5) enables the zoom lens especially to have the optical system considerably reduced in entire length when it is taking a telephoto position and have the optical system enhanced in imaging performance.

When an actual value of Lt/fT is smaller than the lower limit defined in the formula (5), the resultant zoom lens has its optical system excessively reduced in entire length when it is taking a telephoto position, and the zoom lens encounters a difficulty in ensuring the desired optical performance when it is taking a wide-angle position.

Reversely, when an actual value of Lt/fT exceeds the upper limit defined in the formula (5), the resultant zoom lens has its optical system increased in entire length when it is taking a telephoto position, which hinders downsizing the lens barrel.

BRIEF DESCRIPTION OF THE DRAWINGS

FIG. 21 is a diagrammatic representation of a camera incorporating a zoom lens in accordance with the present invention and image sensors.

BEST MODE OF THE INVENTION

As shown in FIG. 21, a camera device 100 in accordance with the present invention comprises a zoom lens 110 and image sensors 120 disposed on or behind the imaging plane of the zoom lens, for converting an optical image created by the zoom lens into electrical signals.

Embodiment 1

Figure 1:
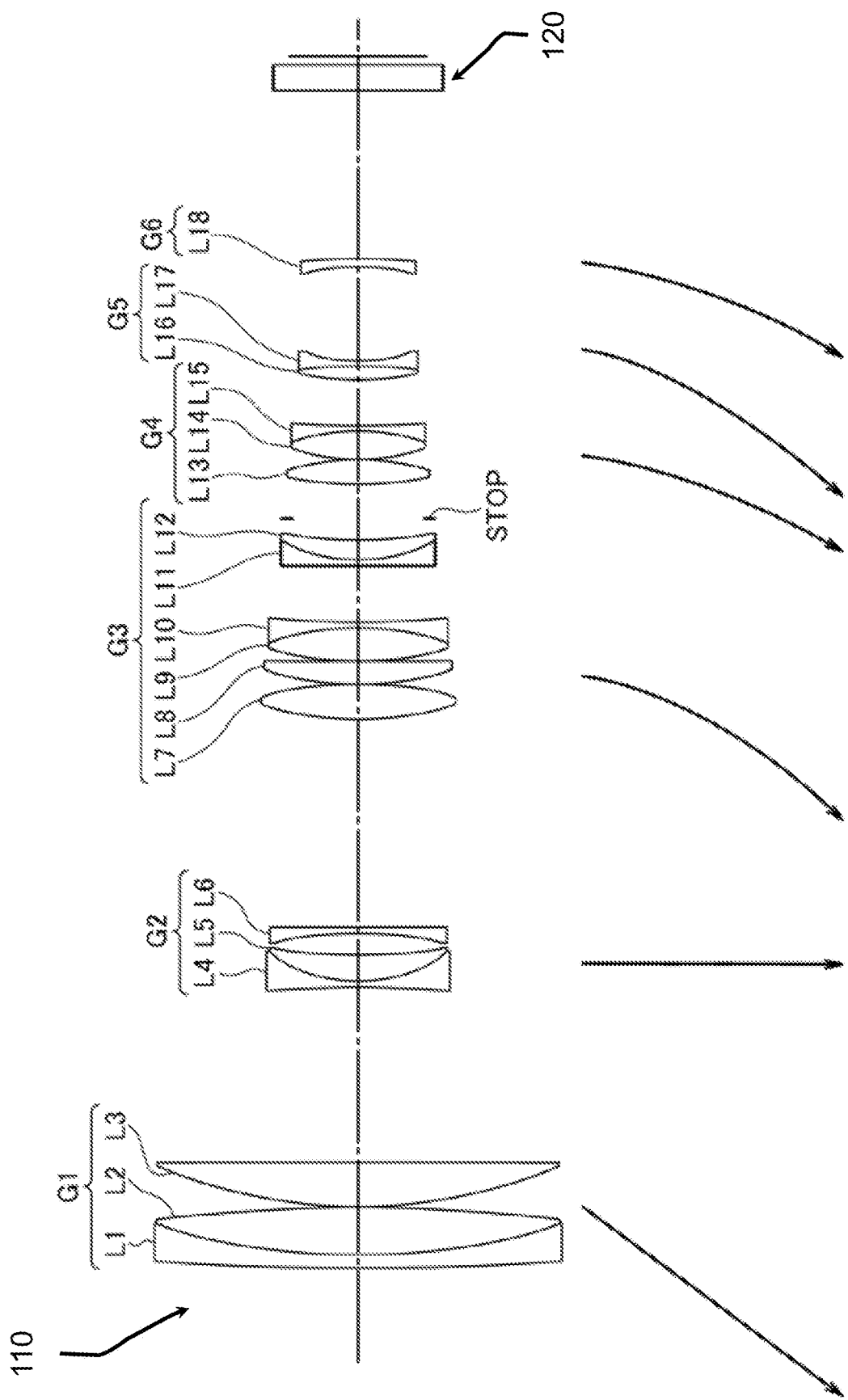
FIG. 1 is a vertical sectional view showing a lens arrangement in a first embodiment of a zoom lens according to the present invention when the zoom lens is taking a wide-angle position.
Figure 2:
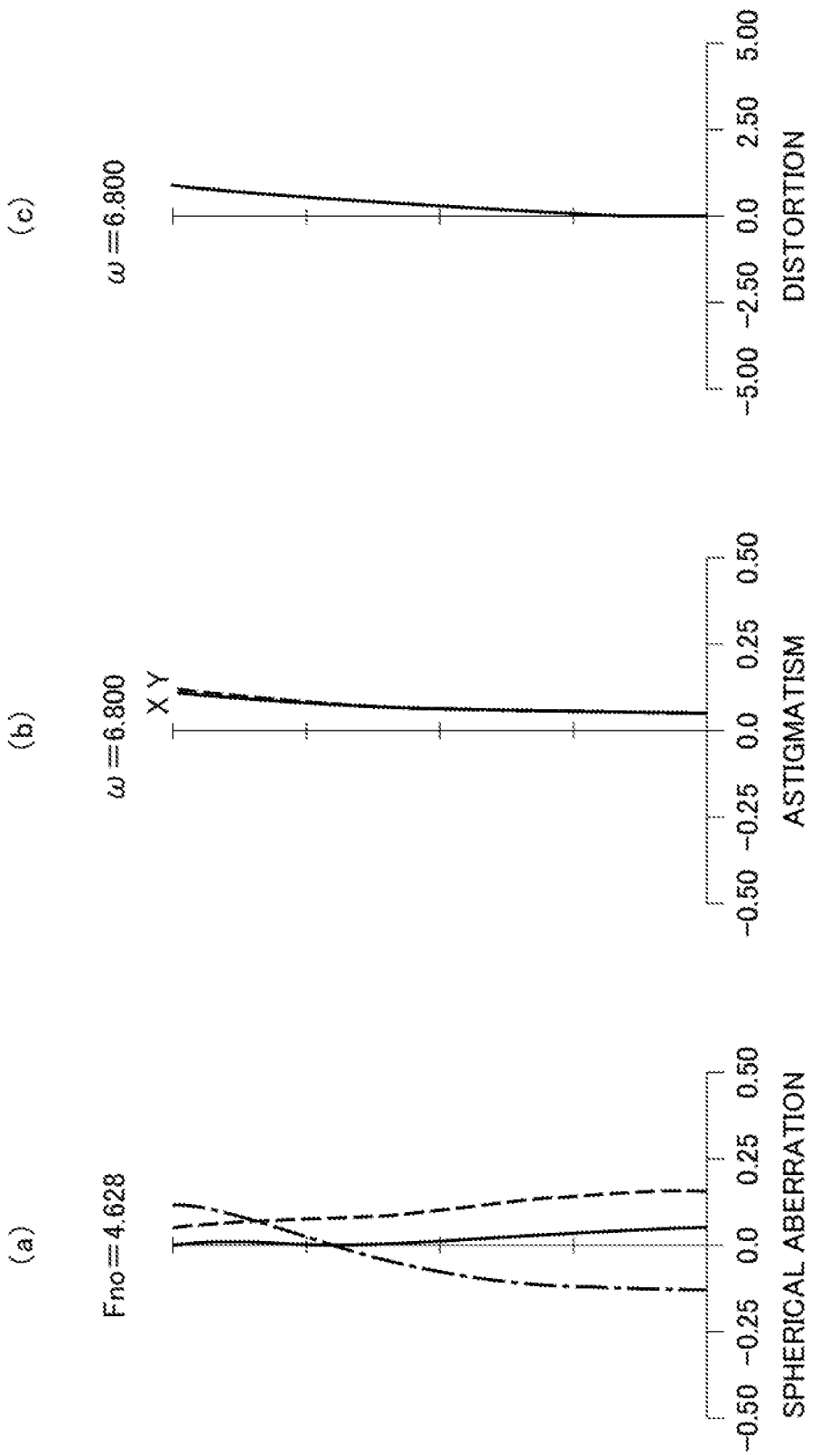
FIG. 2 depicts graphs of spherical aberration, astigmatism, and distortion aberration developed in the first embodiment of the zoom lens when the zoom lens taking a wide-angle position is in focus at a point at infinity, the graphs of spherical aberration showing a ratio of a stop setting F-number to the full diaphragm stop setting F-number on the vertical axis and a degree of defocusing on the horizontal axis for the d-line (wavelength 587.6 nm) expressed by solid line, the c-line (wavelength 656.3 nm) by broken line, and the g-line (wavelength 435.8 nm) by alternate long and short dash line, the graphs of astigmatism showing an image height on the vertical axis and a degree of defocusing on the horizontal axis for a sagittal imaging plane expressed by solid line and a meridional imaging plane by broken line, and the graphs of distortion aberration show an image height on the vertical axis and a degree of distortion in percentage.
Figure 3:
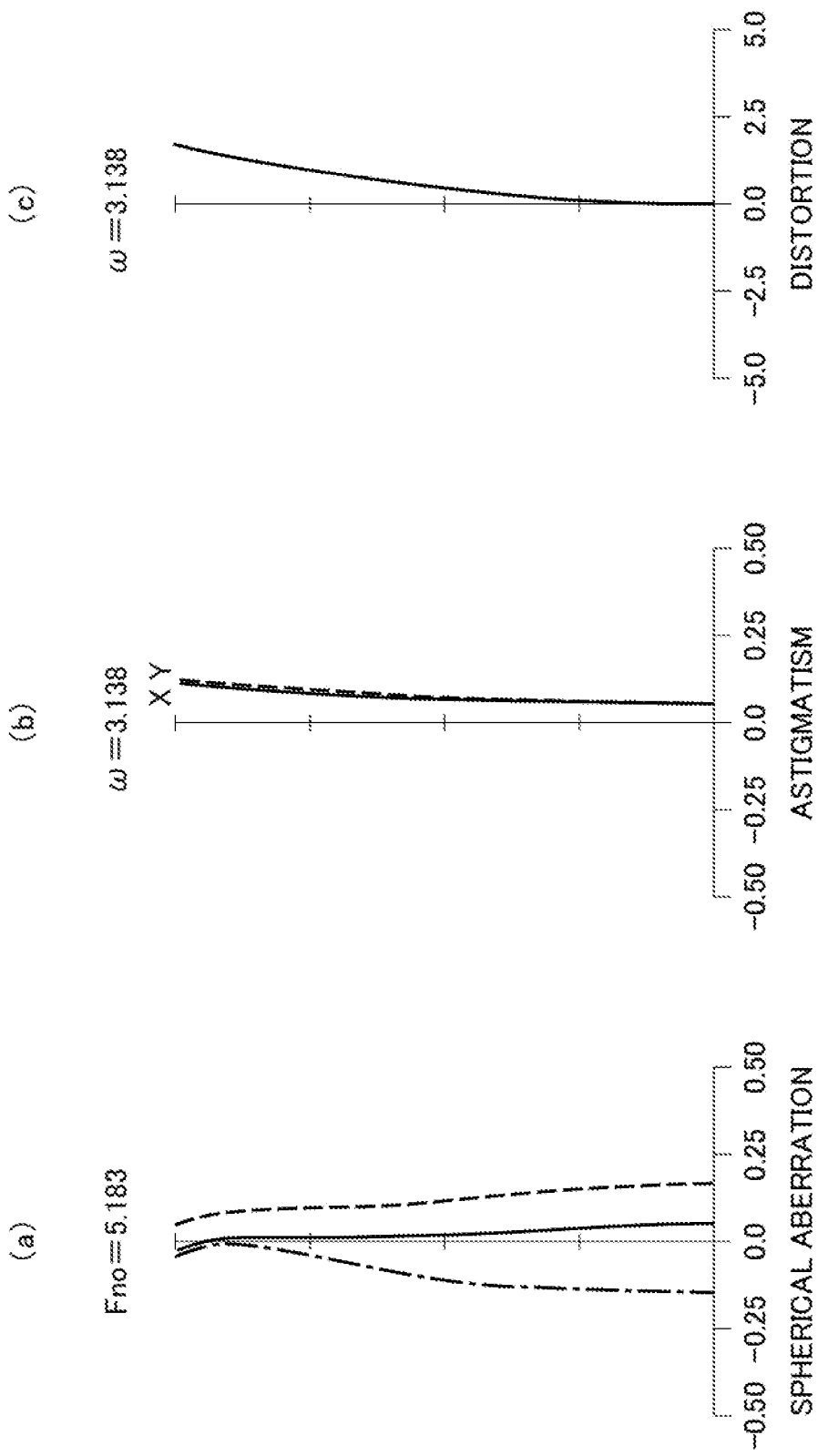
FIG. 3 depicts graphs of spherical aberration, astigmatism, and distortion aberration developed in the first embodiment of the zoom lens when the zoom lens taking an intermediate zooming state is in focus at a point at infinity.
Figure 4:
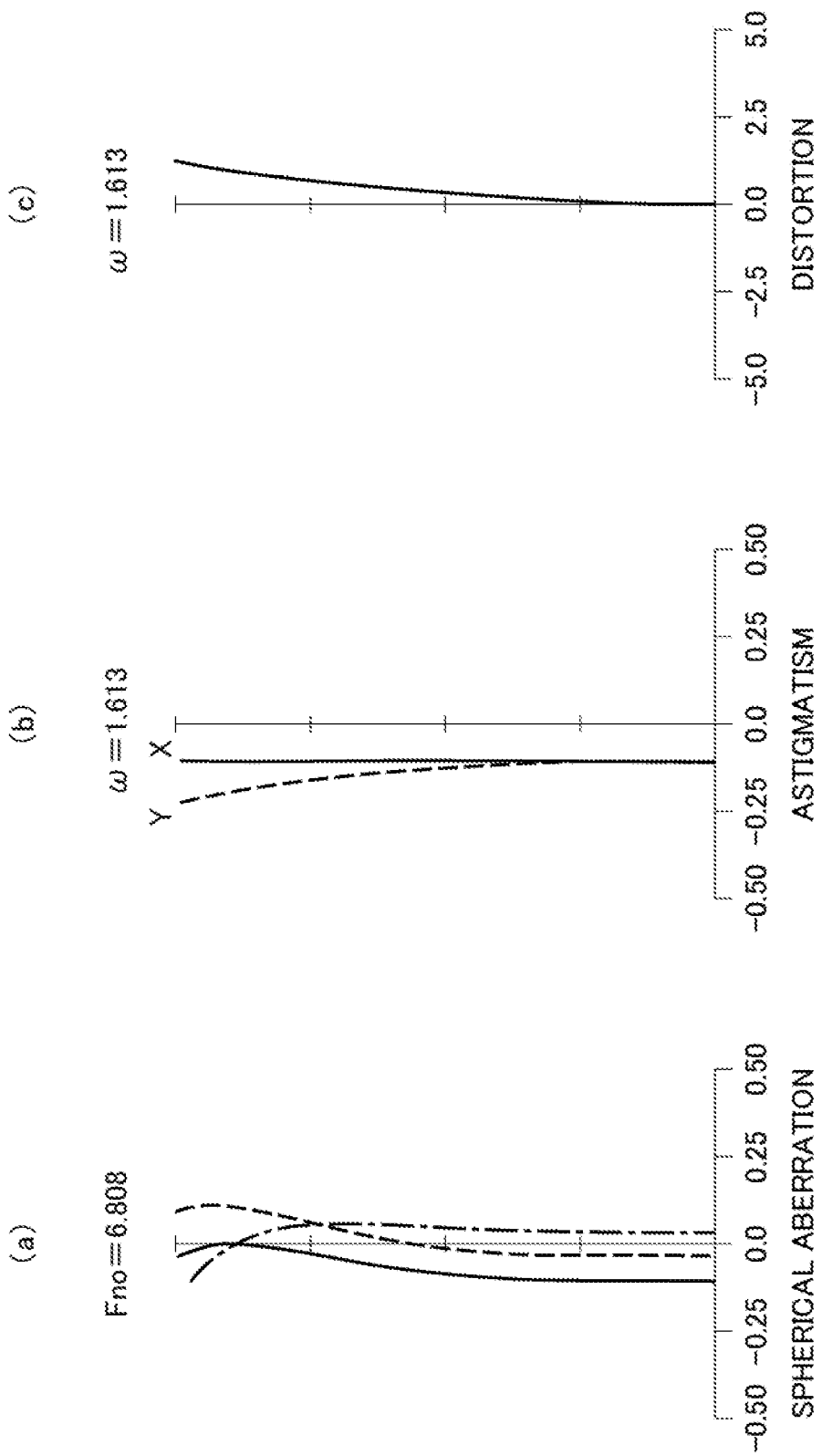
FIG. 4 depicts graphs of spherical aberration, astigmatism, and distortion aberration developed in the first embodiment of the zoom lens when the zoom lens taking a telephoto position is in focus at a point at infinity.

FIG. 1 is a vertical sectional view showing a lens arrangement of a first embodiment of a zoom lens according to the present invention. The first embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, the fifth lens group G5 of negative refractive power, and the rearmost or sixth lens group G6 of negative refractive power arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of negative refractive power with its concave surface oriented toward the object and a meniscus lens piece L5 of positive refractive power cemented with the lens piece L4, and a meniscus lens piece L6 of negative refractive power with its concave surface oriented toward the object.

The third lens group G3 comprises a biconvex lens piece L7, a biconvex lens piece L8, a duplet of a lens piece L9 of positive refractive power with its convex surface oriented toward the object and a lens piece L10 of negative refractive power cemented with the lens piece L9, and another duplet of a biconcave lens piece L11 and a meniscus lens piece L12 of positive refractive power with its convex surface oriented toward the object, all the lens pieces arranged in this order from the closest to the object in the foremost position to the farthest in the rearmost position.

The fourth lens group G4 comprises a biconvex lens piece L13, and a duplet of a lens piece L14 of positive refractive power with its convex surface oriented toward the object and a lens piece L15 of positive refractive power cemented with the lens piece L14, all the lens pieces being arranged in this order from the closest to the object in the foremost position to the farthest from the object in the rearmost position.

The fifth lens group G5 comprises a duplet of a biconvex lens piece L16 positioned closer to the object and a biconcave lens piece L17 cemented with the biconvex lens piece L16.

The sixth lens group G6 comprises a meniscus lens piece L18 of negative refractive power with its concave surface oriented toward the object.

During varying magnification from the wide-angle and to the telephoto position, the first embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, its fifth lens group moved toward the object, and its sixth lens group moved in the same manner as the fourth lens group.

Focusing on an object at the near point is carried out by moving the fifth lens group toward the imaging plane. For that purpose, the duplet of the lens pieces L11 and L12 cemented together is moved in vertical directions normal to the optical axis so as to correct fuzziness of an image during photographing.

Optical data of the lens pieces in the first embodiment of the zoom lens are provided in Table 1. Surface number NS designates the n-th lens surface of the optical system where all the component lens pieces are arranged in order on the closest-to-the-object-first basis, R is a radius of curvature of the n-th lens surface, D is a distance along the optical axis between a pair of the adjacent lens surfaces, Nd is a refractive index for the d-line (wavelength $\lambda$=587.6 nm), and vd is an Abbe number for the d-line (wavelength $\lambda$=587.6 nm).

An aperture stop or an aperture diaphragm is denoted by STOP suffixed to the surface number.

TABLE 1

| NS | R | D | Nd | vd |
|---|---|---|---|---|
| 1 | 486.4782 | 1.4500 | 1.83400 | 37.34 |
| 2 | 83.3399 | 0.0100 | 1.56732 | 42.84 |
| 3 | 83.3399 | 5.5100 | 1.49700 | 81.61 |
| 4 | −172.8214 | 0.1500 | | |
| 5 | 63.2093 | 5.2914 | 1.48749 | 70.44 |
| 6 | −895.6302 | D(6) | | |
| 7 | 0.0000 | 1.8876 | | |
| 8 | −96.2544 | 0.7500 | 1.76524 | 50.37 |
| 9 | 18.4045 | 0.0100 | 1.56732 | 42.84 |
| 10 | 18.4045 | 3.0631 | 1.80518 | 25.46 |
| 11 | 70.9807 | 2.5194 | | |
| 12 | −41.5515 | 0.7000 | 1.80420 | 46.50 |
| 13 | −10114.4818 | D(13) | | |
| 14 | 39.2470 | 4.1119 | 1.49700 | 81.61 |
| 15 | −41.3613 | 0.1000 | | |
| 16 | 40.1380 | 2.6375 | 1.48749 | 70.44 |
| 17 | −1692.6300 | 0.1000 | | |
| 18 | 43.0535 | 3.8276 | 1.48749 | 70.44 |
| 19 | −29.6342 | 0.0100 | 1.56732 | 42.84 |
| 20 | −29.6342 | 0.7000 | 1.90739 | 33.25 |

TABLE 1-continued

| NS | R | D | Nd | νd |
|---|---|---|---|---|
| 21 | 119.5406 | 6.7000 | | |
| 22 | −1390.5046 | 0.6000 | 1.77791 | 44.07 |
| 23 | 18.4637 | 0.0100 | 1.56732 | 42.84 |
| 24 | 18.4637 | 2.3536 | 1.90366 | 31.31 |
| 25 | 48.8224 | 2.3000 | | |
| 26 STOP | 0.0000 | D(26) | | |
| 27 | 52.7369 | 2.8298 | 1.56732 | 42.84 |
| 28 | −27.8361 | 0.1000 | | |
| 29 | 26.5392 | 3.2246 | 1.54356 | 46.62 |
| 30 | −23.1396 | 0.0100 | 1.56732 | 42.84 |
| 31 | −23.1396 | 0.6000 | 1.90366 | 31.31 |
| 32 | 104.0723 | D(32) | | |
| 33 | 54.2263 | 1.4342 | 1.80518 | 25.46 |
| 34 | −61.6536 | 0.0100 | 1.56732 | 42.84 |
| 35 | −61.6536 | 0.5600 | 1.74161 | 49.80 |
| 36 | 16.9498 | D(36) | | |
| 37 | −24.4610 | 0.9300 | 1.48749 | 70.44 |
| 38 | −87.3035 | 0.0000 | | |
| 39 | 0.0000 | D(39) | | |
| 40 | 0.0000 | 2.8000 | 1.51680 | 64.20 |
| 41 | 0.0000 | 1.0000 | | |

Distances between the adjacent lens surfaces in several pairs in the first embodiment of the zoom lens are given in Table 2 below as well as varied values of the focal distance f, the F-number Fno, and the field angle ω for each of the zooming settings at the wide-angle position (f=68.7634), at the intermediate zooming state (f=149.5669), and at the telephoto position (f=291.2580), respectively.

TABLE 2

| f | 68.7634 | 149.5669 | 291.2580 |
|---|---|---|---|
| Fno | 4.62776 | 5.18280 | 6.80830 |
| ω | 6.8004 | 3.13810 | 1.61270 |
| D(6) | 18.4552 | 49.5086 | 57.3552 |
| D(13) | 24.5140 | 18.2970 | 1.5000 |
| D(26) | 4.3452 | 4.2773 | 7.7592 |
| D(32) | 5.4806 | 1.4000 | 2.7630 |
| D(36) | 11.0774 | 15.1581 | 13.7950 |
| D(39) | 19.7269 | 26.0118 | 39.3269 |

Distances between the adjacent lens surfaces in several pairs in the first embodiment of the zoom lens during focusing on an object at the near point for zooming settings at the wide-angle position (f=68.7634), at the intermediate zooming state (f=149.5669), and at the telephoto position (f=291.2580), respectively, are given in Table 3 below as well as varied values of the focal length f upon focusing on an object at infinite distance away and the distance D(0) from the front surface of the first lens piece to the object.

TABLE 3

| f | 68.7634 | 149.5669 | 291.2580 |
|---|---|---|---|
| D(0) | 1058.11 | 1027.06 | 1019.21 |
| D(32) | 6.6285 | 4.8033 | 12.0080 |
| D(36) | 9.9260 | 11.7548 | 4.5501 |

Embodiment 2

Figure 5:
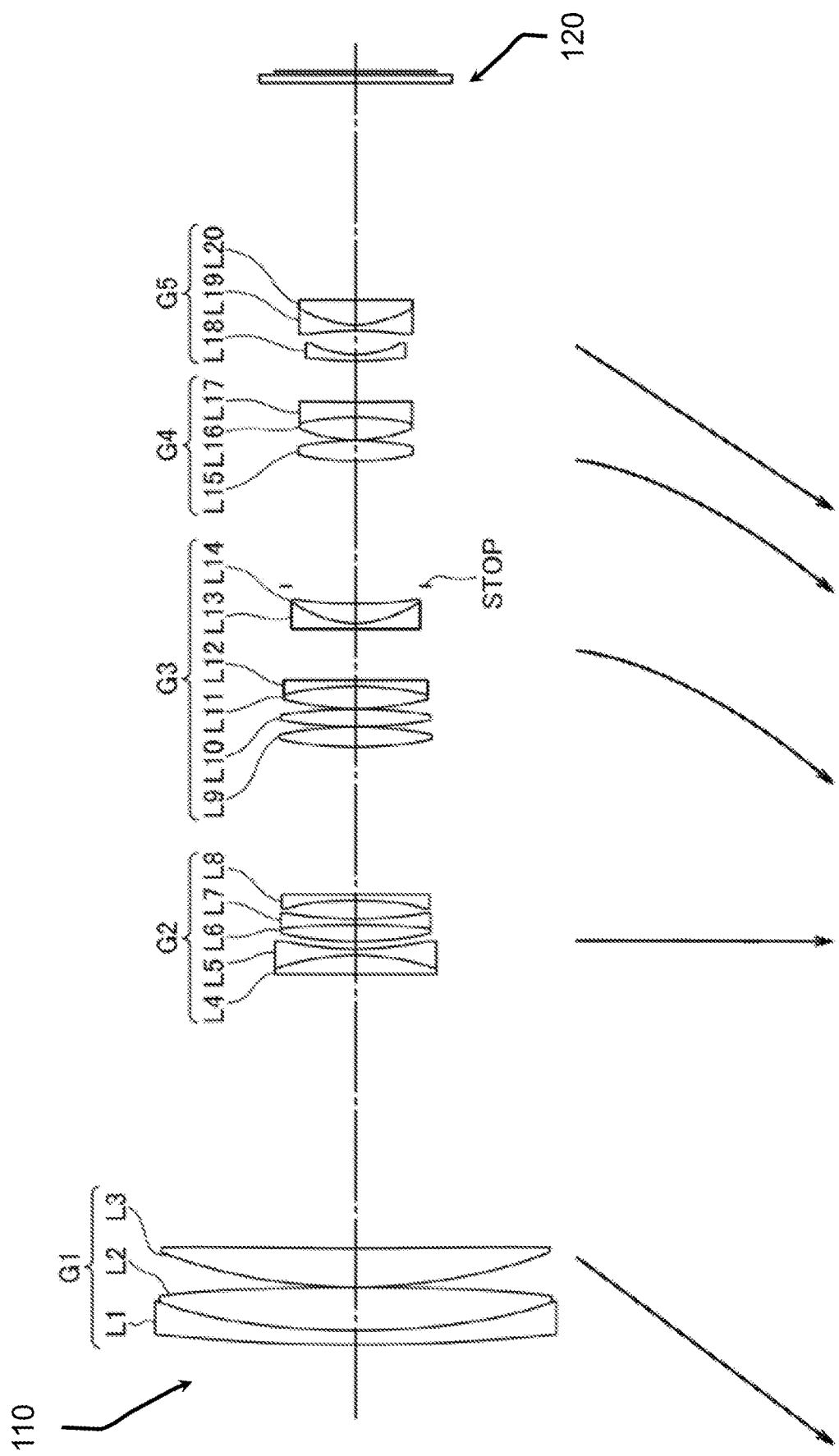
FIG. 5 is a vertical sectional view showing a lens arrangement in a second embodiment of the zoom lens according to the present invention when the zoom lens is taking a wide-angle position.
Figure 6:
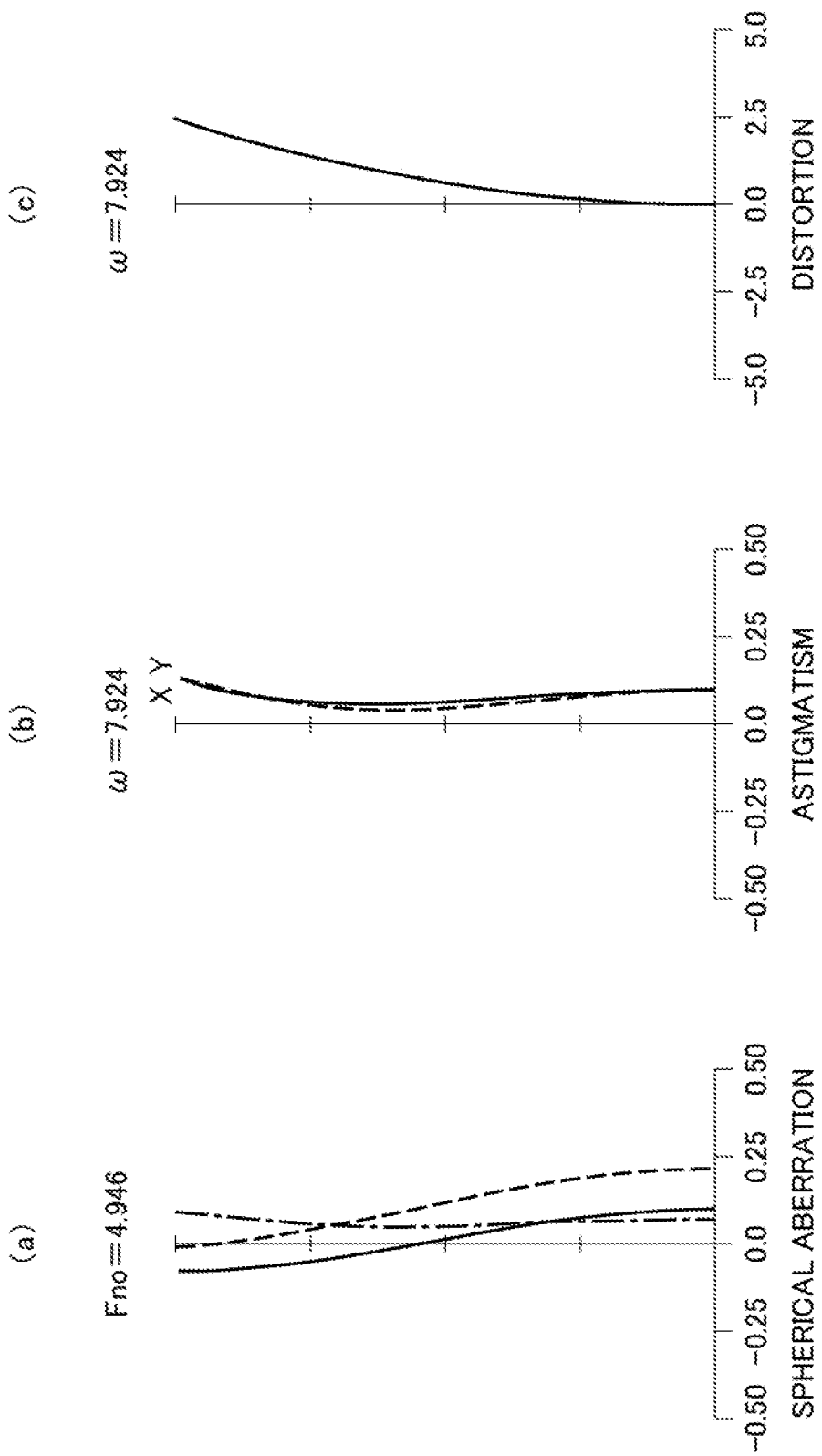
FIG. 6 depicts graphs of spherical aberration, astigmatism, and distortion aberration developed in the second embodiment of the zoom lens when the zoom lens taking a wide-angle position is in focus at a point at infinity.
Figure 7:
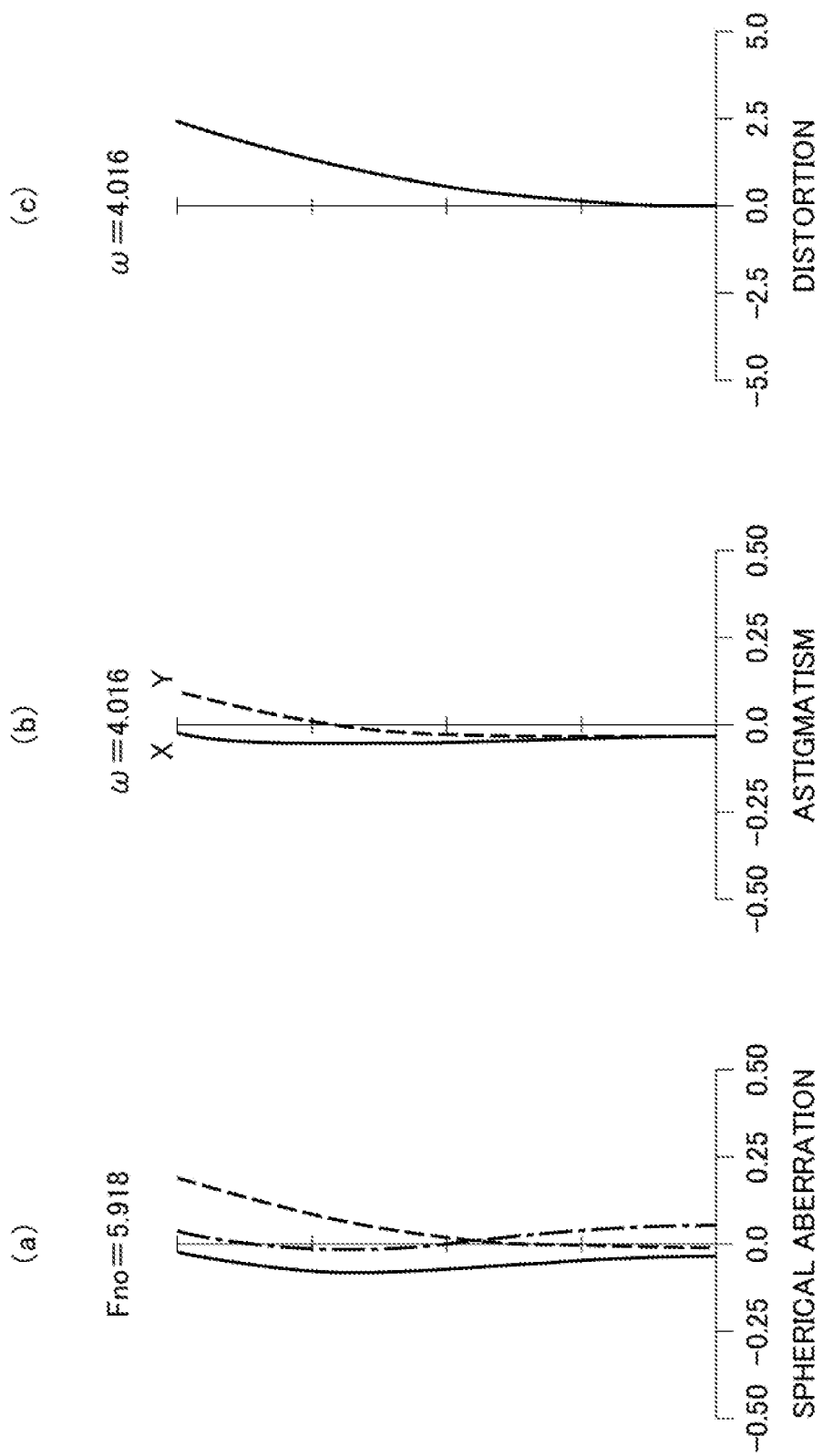
FIG. 7 depicts graphs of spherical aberration, astigmatism, and distortion aberration developed in the second embodiment of the zoom lens when the zoom lens taking an intermediate zooming state is in focus at a point at infinity.
Figure 8:
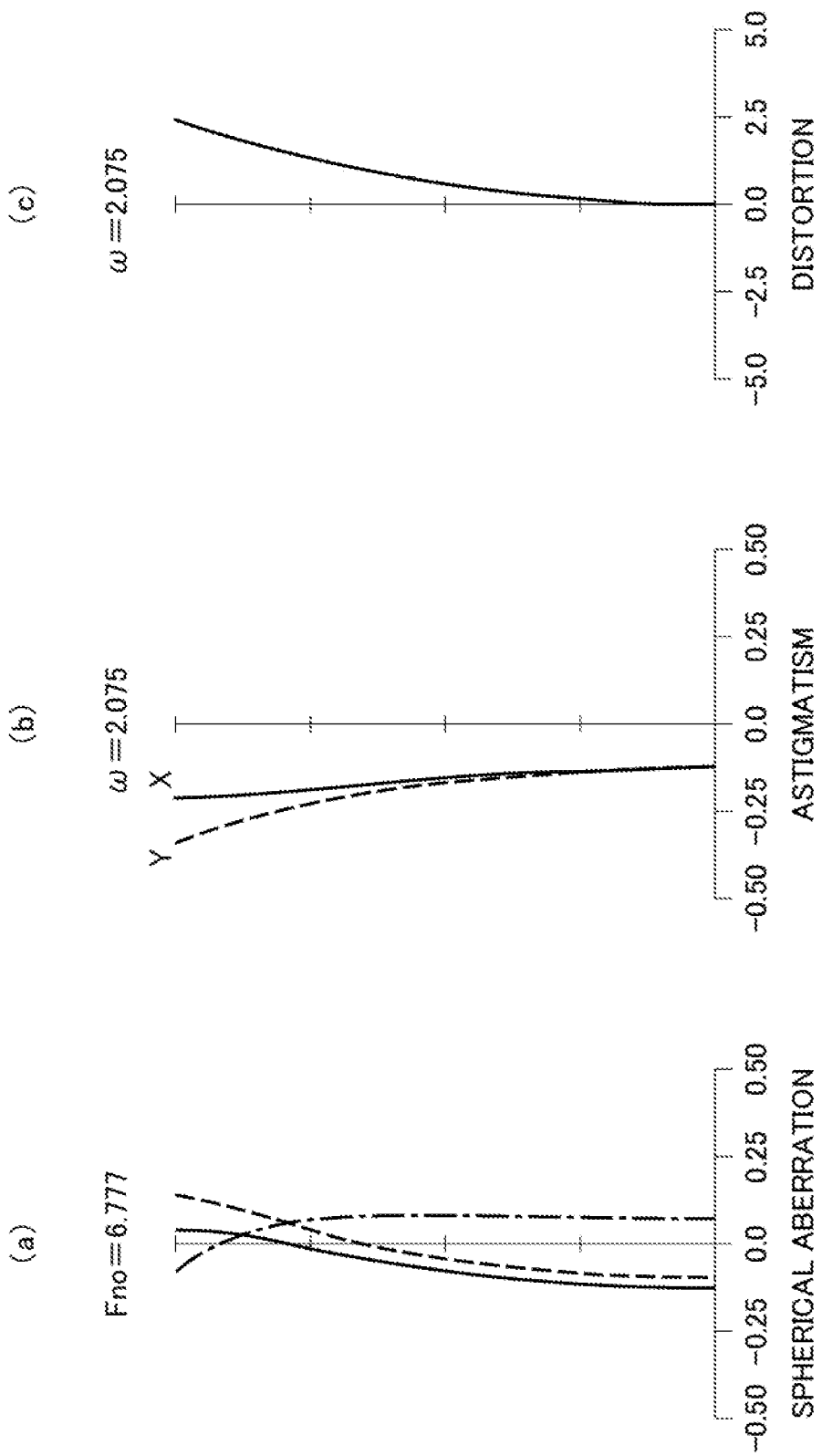
FIG. 8 depicts graphs of spherical aberration, astigmatism, and distortion aberration developed in the second embodiment of the zoom lens when the zoom lens taking a telephoto position is in focus at a point at infinity.

FIG. 5 is a vertical sectional view showing a lens arrangement of a second embodiment of the zoom lens according to the present invention. The second embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a meniscus lens piece L3 of positive refractive power with its convex surface oriented to the object, all the lens pieces being arranged in this order from the closest to the object in the foremost position to the farthest in the rearmost position.

The second lens group G2 comprises a duplet of a lens piece L4 of positive refractive power and a lens piece L5 of negative refractive power cemented with the lens piece L4, another duplet of a lens piece L6 of positive refractive power with its convex surface oriented toward the object and a lens piece L7 of negative refractive power cemented with the lens piece L6, and a meniscus lens piece L8 of negative refractive power with its concave surface oriented to the object, all the lens pieces being arranged in this order from the closest to the object in the foremost position to the farthest in the rearmost position.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a lens piece L20 of positive refractive power cemented with the lens piece L19, all the lens pieces being arranged in this order from the closest to the object in the foremost position to the farthest in the rearmost position.

During varying magnification from the wide-angle and to the telephoto position, the second embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the imaging plane. The duplet of the cemented lens pieces L13 and L14 are moved in directions normal to the optical axis so as to correct fuzziness of an image during photographing.

Optical data of the second embodiment of the zoom lens are provided in Table 4.

TABLE 4

| NS | R | D | Nd | νd |
|---|---|---|---|---|
| 1 | 507.2915 | 3.0000 | 1.83400 | 37.34 |
| 2 | 170.5651 | 0.0200 | 1.56732 | 42.84 |
| 3 | 170.5651 | 10.0500 | 1.49700 | 81.61 |
| 4 | −546.9417 | 0.3000 | | |
| 5 | 140.0409 | 9.1000 | 1.49700 | 81.61 |
| 6 | 6747.4128 | D(6) | | |
| 7 | −462.7175 | 4.4000 | 1.80518 | 25.46 |
| 8 | −59.7377 | 0.0100 | 1.56732 | 42.84 |
| 9 | −59.7377 | 1.6000 | 1.75540 | 47.52 |
| 10 | 89.4635 | 1.7000 | | |
| 11 | 84.1934 | 4.0322 | 1.80518 | 25.46 |
| 12 | −143.0460 | 0.0100 | 1.56732 | 42.84 |
| 13 | −143.0460 | 1.4000 | 1.83481 | 42.72 |
| 14 | 103.1048 | 4.3467 | | |
| 15 | −72.3495 | 1.5000 | 1.90366 | 31.31 |
| 16 | −959.3316 | D(16) | | |
| 17 | 96.4840 | 4.8156 | 1.49700 | 81.61 |
| 18 | −93.3616 | 0.2000 | | |
| 19 | 136.2135 | 3.8473 | 1.48749 | 70.44 |
| 20 | −135.3488 | 0.2000 | | |
| 21 | 74.9337 | 5.3536 | 1.48749 | 70.44 |
| 22 | −69.9732 | 0.0100 | 1.56732 | 42.84 |
| 23 | −69.9732 | 1.5000 | 1.90366 | 31.31 |
| 24 | −1625.6271 | 12.0000 | | |
| 25 | −276.9348 | 1.2000 | 1.80393 | 37.39 |
| 26 | 24.9138 | 0.0100 | 1.56732 | 42.84 |
| 27 | 24.9138 | 4.7931 | 1.83950 | 29.48 |
| 28 | 112.4209 | 4.5000 | | |
| 29 STOP | 0.0000 | D(29) | | |
| 30 | 82.8644 | 4.6000 | 1.50601 | 60.25 |
| 31 | −68.5146 | 0.2000 | | |
| 32 | 38.3468 | 5.4000 | 1.50163 | 62.32 |
| 33 | −58.6905 | 0.0100 | 1.56732 | 42.84 |
| 34 | −58.6905 | 3.3708 | 1.90366 | 31.31 |
| 35 | 1283.2003 | 0.0000 | | |
| 36 | 0.0000 | D(36) | | |
| 37 | 101.8564 | 1.3000 | 1.83481 | 42.72 |
| 38 | 24.0855 | 5.7488 | | |
| 39 | −73.4446 | 1.3504 | 1.48749 | 70.44 |
| 40 | 24.7023 | 0.0100 | 1.56732 | 42.84 |
| 41 | 24.7023 | 5.6000 | 1.66885 | 31.91 |
| 42 | −3665.3014 | D(42) | | |
| 43 | 0.0000 | 2.0000 | 1.51680 | 64.20 |
| 44 | 0.0000 | 1.0000 | | |

Distances between the adjacent lens surfaces in several pairs in the second embodiment of the zoom lens are given in Table 5 below as well as varied values of the focal distance f, the F-number Fno, and the field angle ω for each of the photographing positions at the wide-angle position (f=151.9125), at the intermediate zooming state (f=300.56), and at the telephoto position (f=582.2009), respectively.

TABLE 5

| f | 151.9125 | 300.5600 | 582.2009 |
|---|---|---|---|
| Fno | 4.94595 | 5.91814 | 6.77715 |
| ω | 7.9237 | 4.01640 | 2.07480 |
| D(6) | 64.0000 | 111.8284 | 141.2200 |
| D(16) | 34.6165 | 23.4740 | 2.0400 |
| D(29) | 28.9568 | 16.6652 | 23.1985 |
| D(36) | 9.6584 | 5.9504 | 3.1420 |
| D(42) | 51.0000 | 78.1421 | 95.8512 |

Distances between the adjacent lens surfaces in several pairs in the second embodiment of the zoom lens during focusing on an object at the near point for zooming settings at the wide-angle position (f=151.9125), at the intermediate zooming state (f=300.56), and at the telephoto position (f=582.2009), respectively, are given in Table 6 below as well as varied values of the focal length f upon focusing on an object at infinite distance away and the distance D(0) from the front surface of the first lens piece to the object.

TABLE 6

| f | 151.9125 | 300.5600 | 582.2009 |
|---|---|---|---|
| D(0) | 2401.28 | 2353.45 | 2324.06 |
| D(29) | 27.6147 | 13.4871 | 14.3841 |
| D(36) | 11.0005 | 9.1285 | 11.9565 |

Embodiment 3

Figure 9:
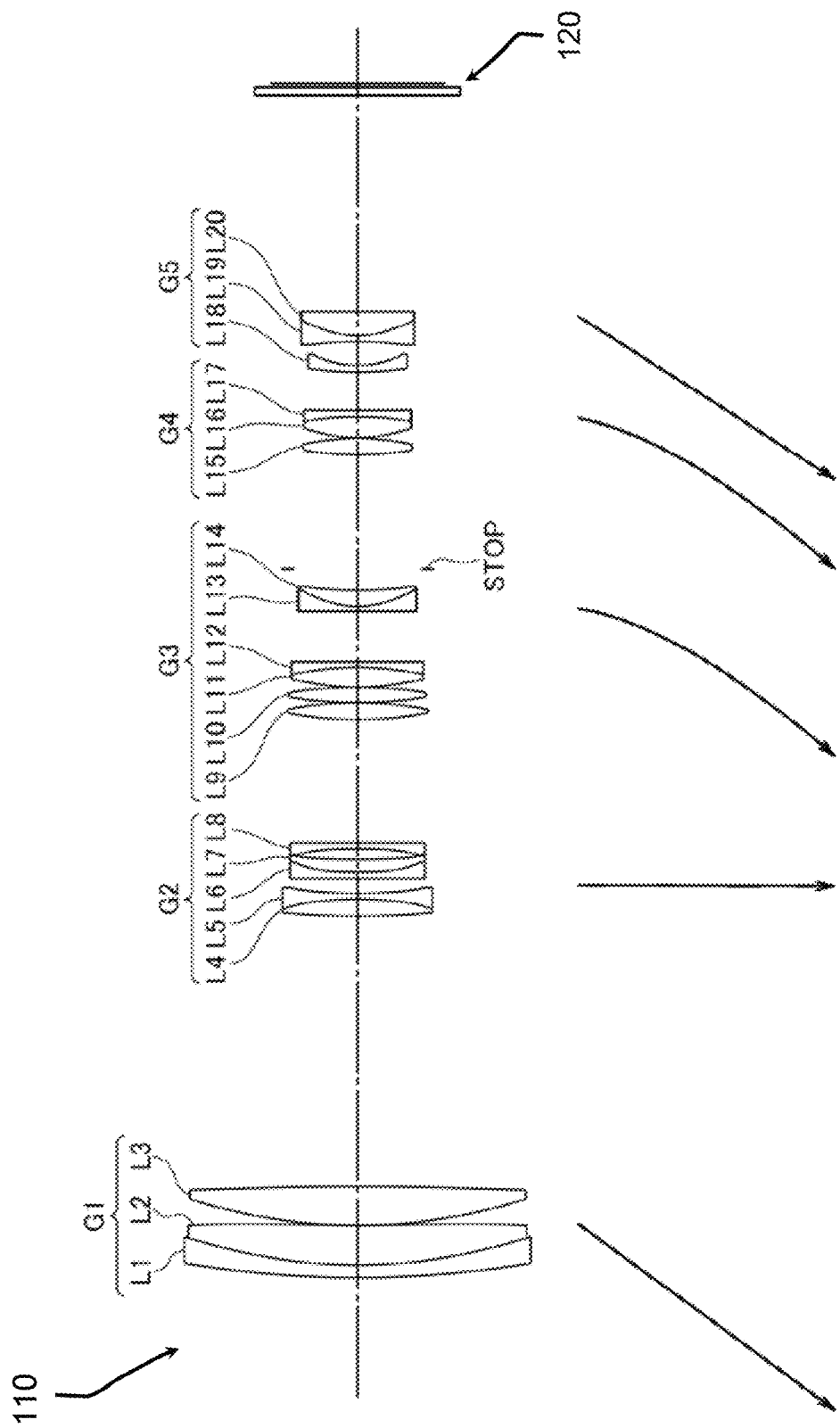
FIG. 9 is a vertical sectional view showing a third embodiment of the zoom lens according to the present invention when the zoom lens is taking a wide-angle position.
Figure 10:
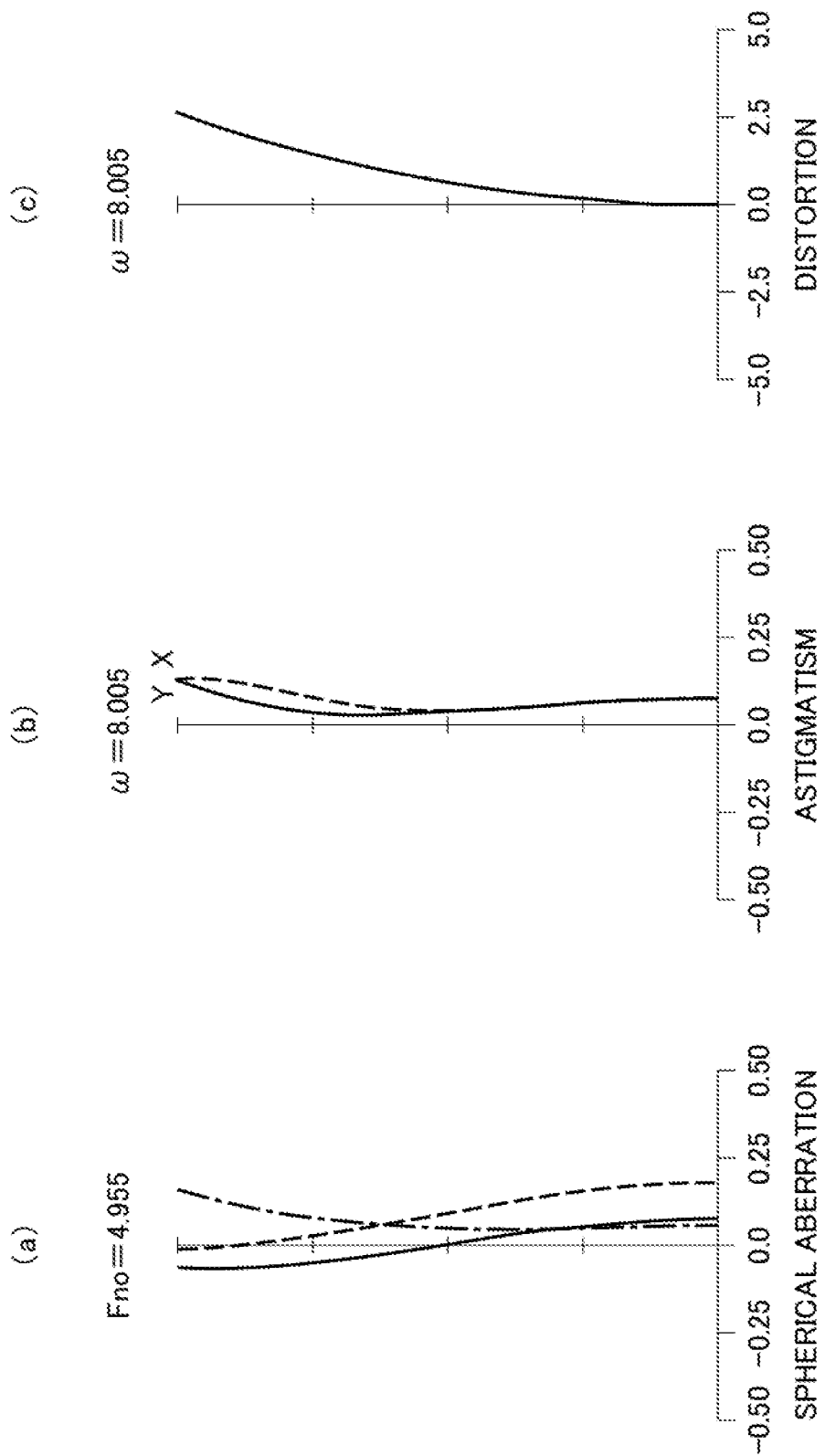
FIG. 10 depicts graphs of spherical aberration, astigmatism, and distortion aberration developed in the third embodiment of the zoom lens when the zoom lens taking a wide-angle position is in focus at a point at infinity.
Figure 11:
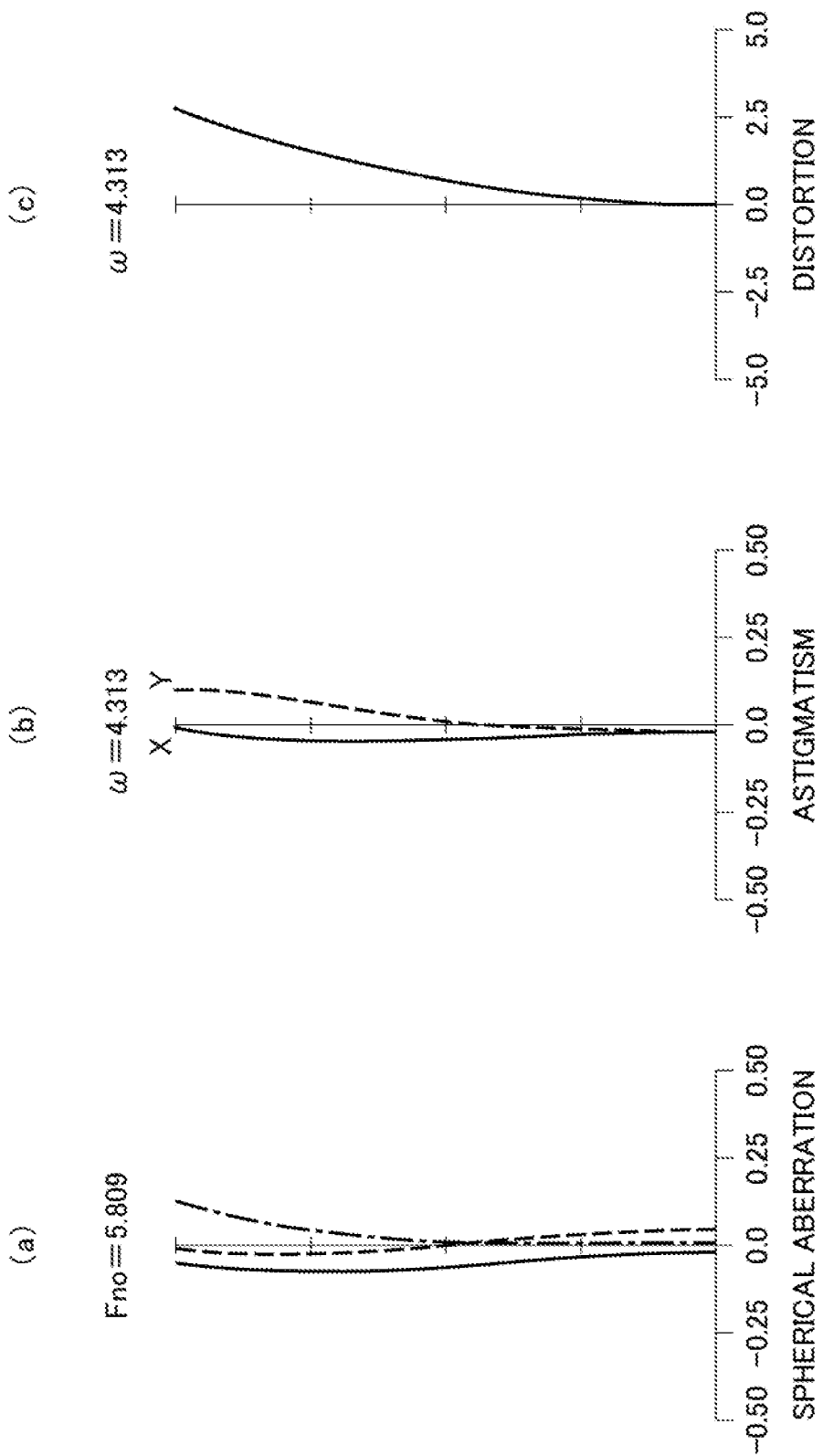
FIG. 11 depicts graphs of spherical aberration, astigmatism, and distortion aberration developed in the third embodiment of the zoom lens when the zoom lens taking an intermediate zooming state is in focus at a point at infinity.
Figure 12:
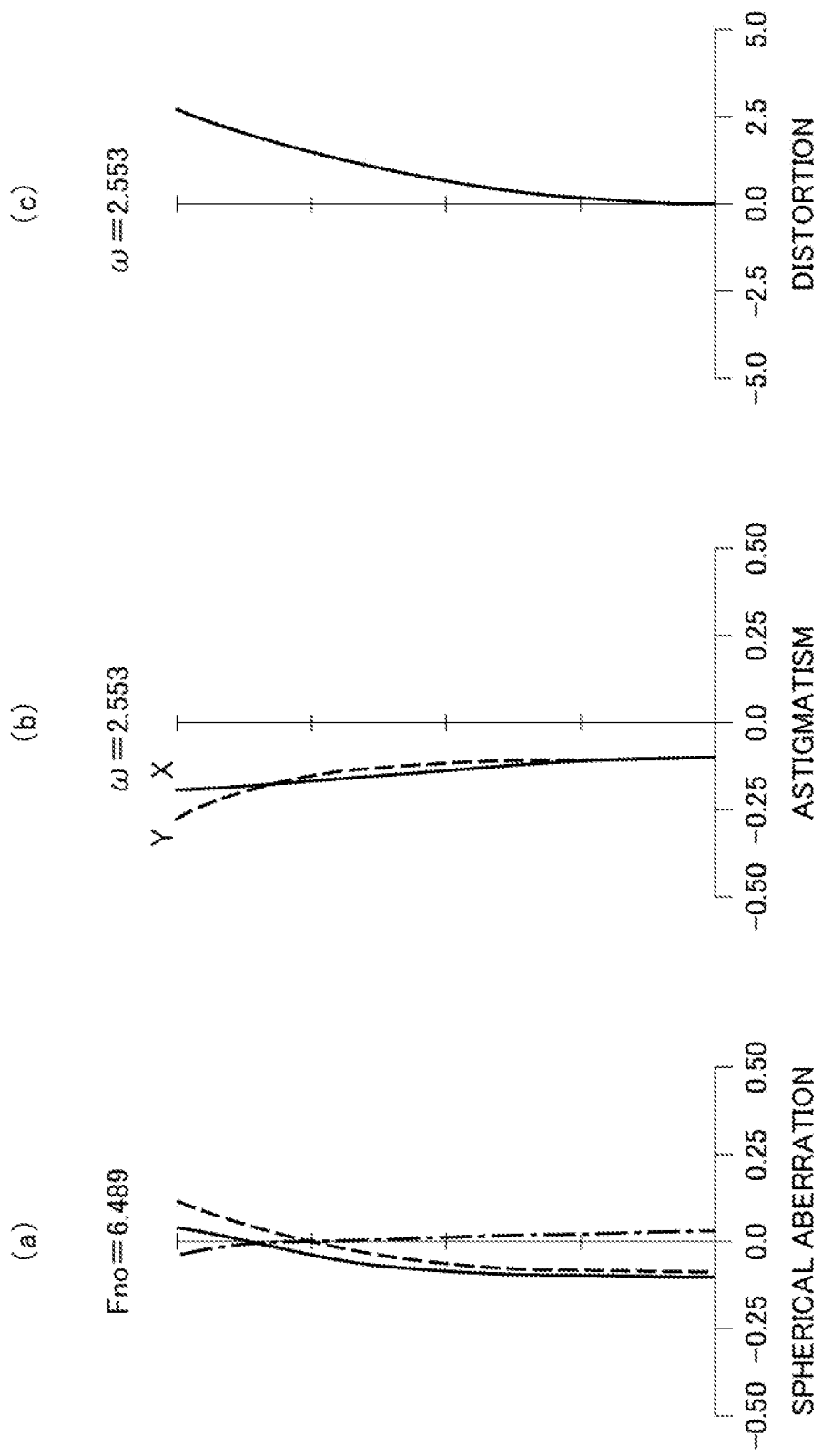
FIG. 12 depicts graphs of spherical aberration, astigmatism, and distortion aberration developed in the third embodiment of the zoom lens when the zoom lens taking a telephoto position is in focus at a point at infinity.

FIG. 9 is a vertical sectional view showing a lens arrangement of a third embodiment of the zoom lens according to the present invention. The third embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a meniscus lens piece L20 of positive refractive power with its convex surface oriented to the object, and cemented with the lens piece L19, all the lens pieces being arranged in this order from the closest to the object in the foremost position to the farthest in the rearmost position.

During varying magnification from the wide-angle and to the telephoto position, the third embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the third embodiment of the zoom lens are provided in Table 7.

TABLE 7

| NS | R | D | Nd | νd |
|---|---|---|---|---|
| 1 | 297.9129 | 2.8300 | 1.83400 | 37.34 |
| 2 | 135.0384 | 0.0200 | 1.56732 | 42.84 |
| 3 | 135.0384 | 9.3000 | 1.49700 | 81.61 |
| 4 | −4966.1736 | 0.3000 | | |
| 5 | 146.0473 | 8.5000 | 1.49700 | 81.61 |
| 6 | −1305.5193 | D(6) | | |
| 7 | 213.6104 | 4.2002 | 1.80518 | 25.46 |
| 8 | −62.5956 | 0.0100 | 1.56732 | 42.84 |
| 9 | −62.5956 | 1.5700 | 1.74645 | 49.97 |
| 10 | 144.9586 | 3.2900 | | |
| 11 | −612.2359 | 1.4500 | 1.83404 | 40.21 |
| 12 | 48.5752 | 0.0100 | 1.56732 | 42.84 |
| 13 | 48.5752 | 3.2100 | 1.80518 | 25.46 |
| 14 | 152.1415 | 2.4500 | | |
| 15 | −71.1073 | 1.4200 | 1.90366 | 31.31 |
| 16 | 2627.1686 | D(16) | | |
| 17 | 97.4108 | 3.9312 | 1.49700 | 81.61 |
| 18 | −83.4307 | 0.2000 | | |
| 19 | 126.7004 | 3.1209 | 1.48749 | 70.44 |
| 20 | −143.7416 | 0.2000 | | |
| 21 | 69.4530 | 4.8712 | 1.48749 | 70.44 |
| 22 | −68.6082 | 0.0100 | 1.56732 | 42.84 |
| 23 | −68.6082 | 1.4200 | 1.90366 | 31.31 |
| 24 | −2644.7437 | 12.0500 | | |
| 25 | −271.3050 | 1.2500 | 1.82533 | 40.81 |
| 26 | 28.0112 | 0.0100 | 1.56732 | 42.84 |
| 27 | 28.0112 | 3.9500 | 1.89851 | 30.99 |
| 28 | 101.7617 | 4.4401 | | |
| 29 STOP | 0.0000 | D(29) | | |
| 30 | 89.3134 | 3.7900 | 1.52994 | 52.35 |
| 31 | −63.6313 | 0.2000 | | |
| 32 | 36.8157 | 5.1142 | 1.50170 | 69.40 |
| 33 | −56.3810 | 0.0100 | 1.56732 | 42.84 |
| 34 | −56.3810 | 1.3200 | 1.90366 | 31.31 |
| 35 | 1002.5920 | 0.0000 | | |
| 36 | 0.0000 | D(36) | | |
| 37 | 101.3957 | 1.2500 | 1.81828 | 43.28 |
| 38 | 23.0588 | 5.9200 | | |
| 39 | −51.4450 | 1.4000 | 1.48749 | 70.44 |
| 40 | 26.1939 | 0.0100 | 1.56732 | 42.84 |
| 41 | 26.1939 | 5.4332 | 1.72579 | 34.70 |
| 42 | −206.0292 | D(42) | | |
| 43 | 0.0000 | 2.0000 | 1.51680 | 64.20 |
| 44 | 0.0000 | 1.0000 | | |

Distances between the adjacent lens surfaces in several pairs in the third embodiment of the zoom lens are given in Table 8 below as well as varied values of the focal distance f, the F-number Fno, and the field angle ω for each of the photographing positions at the wide-angle position (f=153.8209), at the intermediate zooming state (f=286.8109), and at the telephoto position (f=485.2042), respectively.

TABLE 8

| f | 153.8209 | 286.8109 | 485.2042 |
|---|---|---|---|
| Fno | 4.95462 | 5.80954 | 6.48931 |
| ω | 8.0054 | 4.31340 | 2.55290 |

TABLE 8-continued

| D(6) | 64.9509 | 105.7871 | 129.7209 |
|---|---|---|---|
| D(16) | 29.9346 | 17.8473 | 2.2000 |
| D(29) | 27.7446 | 20.6475 | 22.7820 |
| D(36) | 9.7788 | 6.8423 | 4.4105 |
| D(42) | 51.3300 | 73.4510 | 89.3956 |

Distances between the adjacent lens surfaces in several pairs in the third embodiment of the zoom lens during focusing on an object at the near point for zooming settings at the wide-angle position (f=153.8209), at the intermediate zooming state (f=286.8109), and at the telephoto position (f=485.2042), respectively, are given in Table 9 below as well as varied values of the focal length f upon focusing on an object at infinite distance away and the distance D(0) from the front surface of the first lens piece to the object.

TABLE 9

| f | 153.8209 | 286.8109 | 485.2042 |
|---|---|---|---|
| D(0) | 2014.80 | 1973.96 | 1950.03 |
| D(29) | 26.0200 | 16.6583 | 13.9700 |
| D(36) | 11.5034 | 10.8315 | 13.2225 |

Embodiment 4

Figure 13:
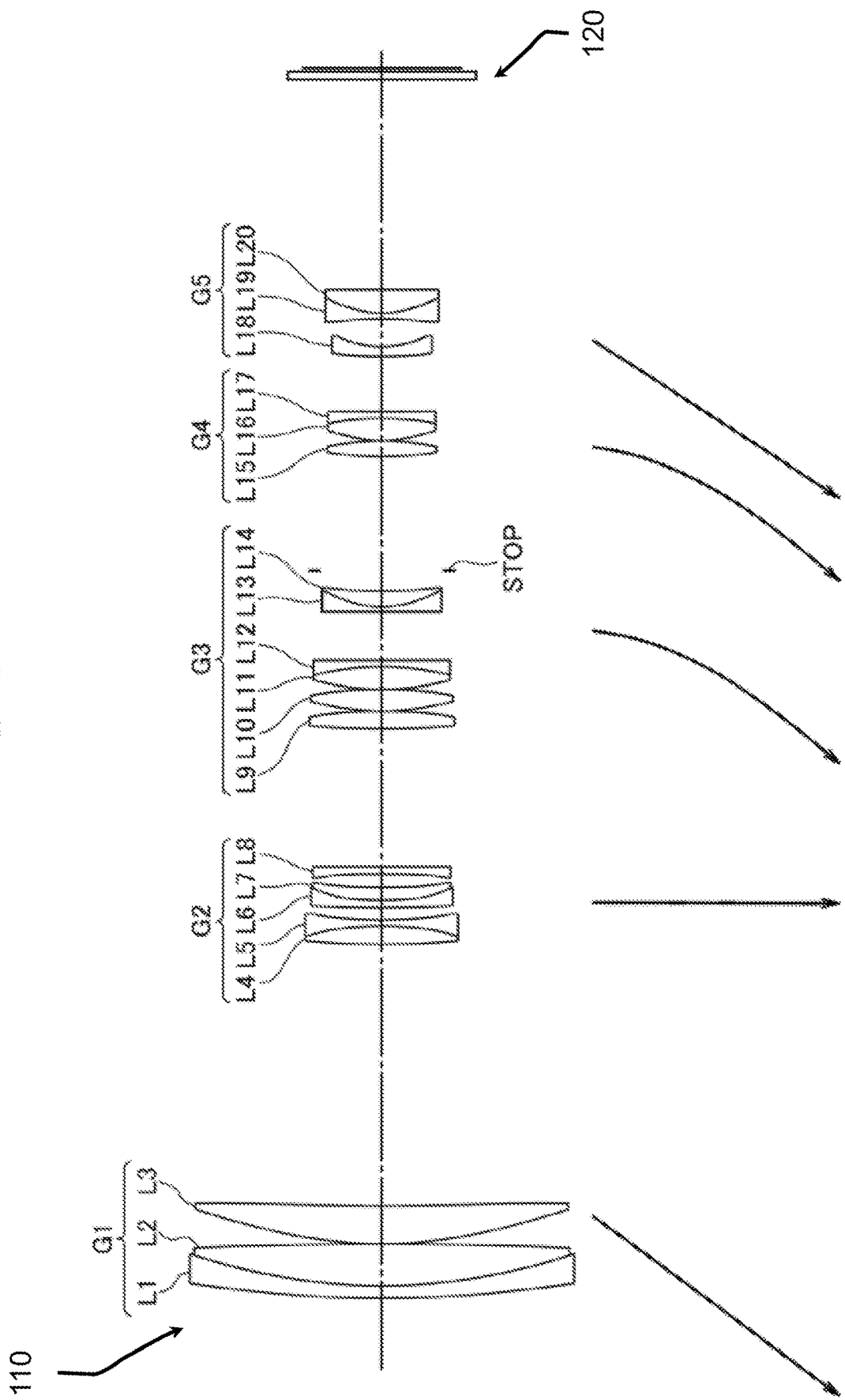
FIG. 13 is a vertical sectional view showing a fourth embodiment of the zoom lens according to the present invention when the zoom lens is taking a wide-angle position.
Figure 14:
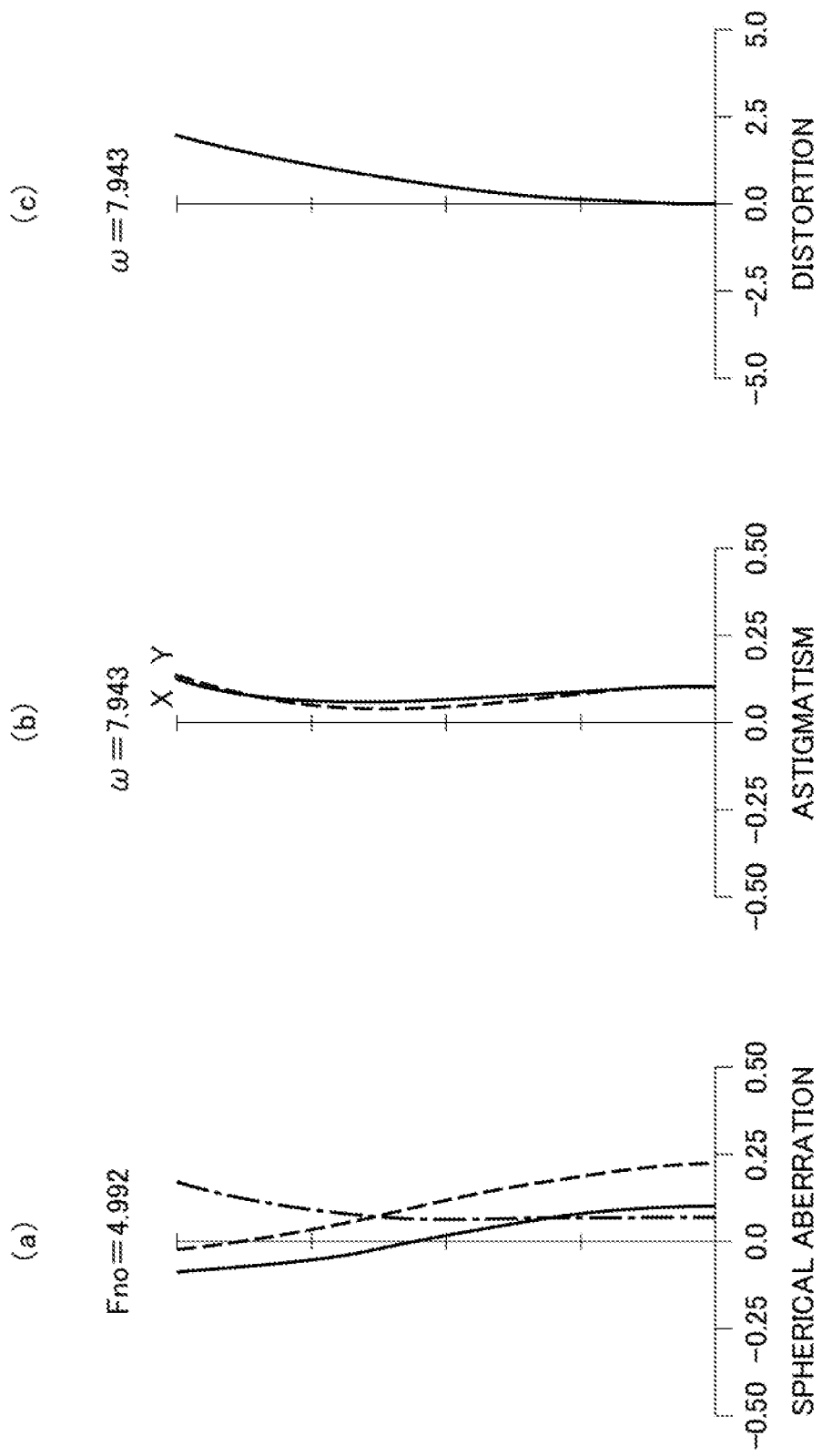
FIG. 14 depicts graphs of spherical aberration, astigmatism, and distortion aberration developed in the fourth embodiment of the zoom lens when the zoom lens taking a wide-angle position is in focus at a point at infinity.
Figure 15:
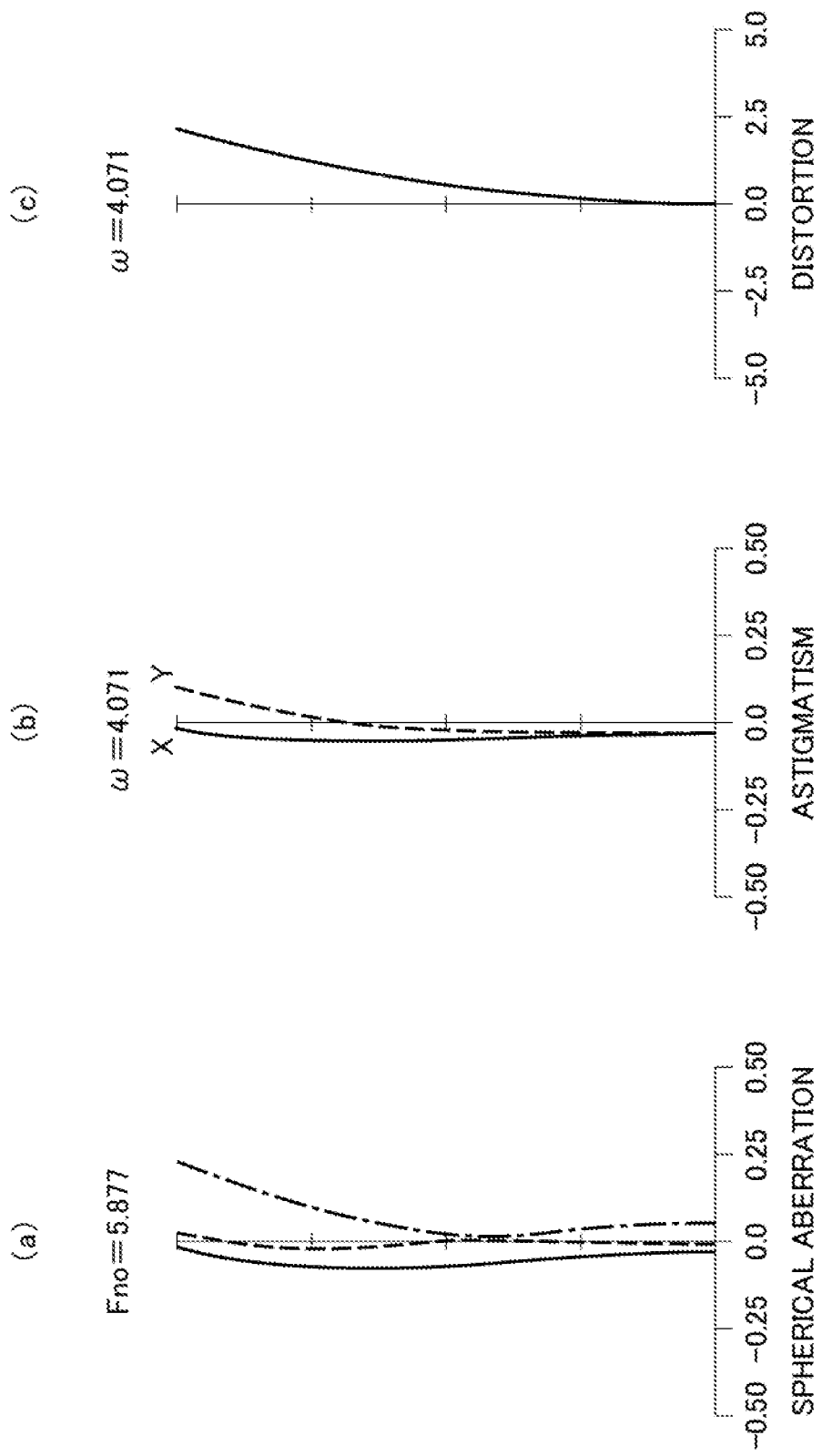
FIG. 15 depicts graphs of spherical aberration, astigmatism, and distortion aberration developed in the fourth embodiment of the zoom lens when the zoom lens taking an intermediate zooming state is in focus at a point at infinity.
Figure 16:
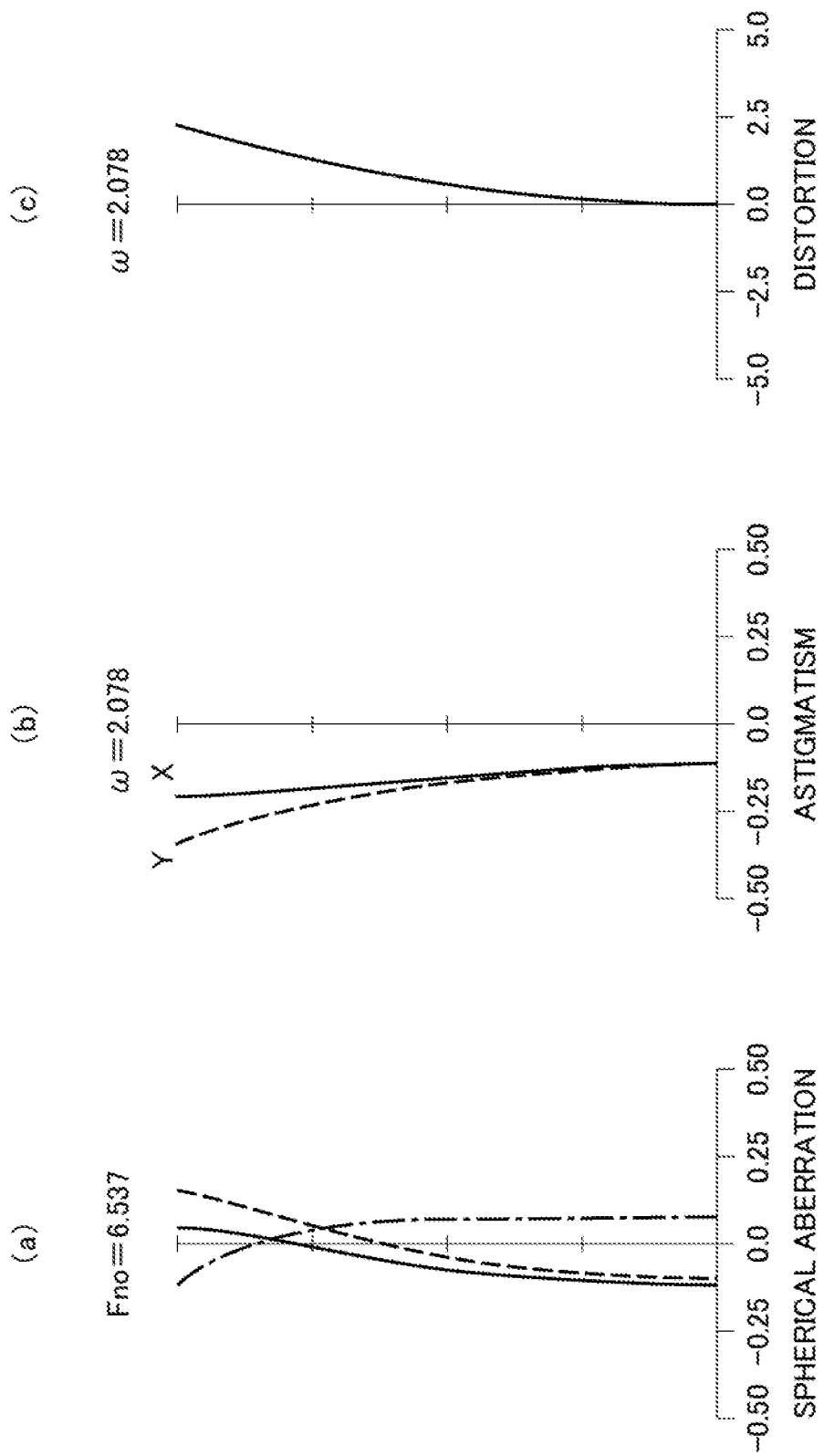
FIG. 16 depicts graphs of spherical aberration, astigmatism, and distortion aberration developed in the fourth embodiment of the zoom lens when the zoom lens taking a telephoto position is in focus at a point at infinity.

FIG. 13 is a vertical sectional view showing a lens arrangement of a fourth embodiment of the zoom lens according to the present invention. The fourth embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a meniscus lens piece L20 of positive refractive power with its convex surface oriented to the object, and cemented with the lens piece L19, all the lens pieces being arranged in this order on the basis of the foremost first.

During shifting from the wide-angle position to the telephoto position to vary magnification, the fourth embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the fourth embodiment of the zoom lens are provided in Table 10.

TABLE 10

| NS | R | D | Nd | vd |
|---|---|---|---|---|
| 1 | 426.3567 | 3.0000 | 1.83400 | 37.34 |
| 2 | 159.9066 | 0.0200 | 1.56732 | 42.84 |
| 3 | 159.9066 | 10.0500 | 1.49700 | 81.61 |
| 4 | −684.4955 | 0.3000 | | |
| 5 | 140.0775 | 9.1000 | 1.49700 | 81.61 |
| 6 | 8733.4134 | D(6) | | |
| 7 | 558.1944 | 4.4000 | 1.80518 | 25.46 |
| 8 | −61.1413 | 0.0100 | 1.56732 | 42.84 |
| 9 | −61.1413 | 1.6000 | 1.72916 | 54.67 |
| 10 | 177.9802 | 2.6000 | | |
| 11 | 583.7869 | 1.5000 | 1.80450 | 39.64 |
| 12 | 50.6562 | 0.0100 | 1.56732 | 42.84 |
| 13 | 50.6562 | 3.4000 | 1.80518 | 25.46 |
| 14 | 142.9473 | 3.7000 | | |
| 15 | −73.8510 | 1.5000 | 1.90366 | 31.31 |
| 16 | 515.2175 | D(16) | | |
| 17 | 432.7323 | 4.1000 | 1.49700 | 81.61 |
| 18 | −112.9310 | 0.2000 | | |
| 19 | 73.5789 | 5.2184 | 1.48749 | 70.44 |
| 20 | −95.0713 | 0.2000 | | |
| 21 | 87.0854 | 5.1506 | 1.48749 | 70.44 |
| 22 | −66.1655 | 0.0100 | 1.56732 | 42.84 |
| 23 | −66.1655 | 1.5000 | 1.90366 | 31.31 |
| 24 | −710.1255 | 12.5500 | | |
| 25 | −236.4657 | 0.9000 | 1.74400 | 44.79 |
| 26 | 27.5546 | 0.0100 | 1.56732 | 42.84 |
| 27 | 27.5546 | 4.1589 | 1.80610 | 33.27 |
| 28 | 99.2354 | 4.5500 | | |
| 29 STOP | 0.0000 | D(29) | | |
| 30 | 65.1174 | 4.1342 | 1.51742 | 52.15 |
| 31 | −65.1174 | 0.2000 | | |
| 32 | 50.5972 | 5.4000 | 1.51823 | 58.96 |
| 33 | −48.1430 | 0.0100 | 1.56732 | 42.84 |
| 34 | −48.1430 | 1.3000 | 1.90366 | 31.31 |
| 35 | 1899.0359 | 0.0000 | | |
| 36 | 0.0000 | D(36) | | |
| 37 | 113.8672 | 2.2800 | 1.83481 | 42.72 |
| 38 | 25.8597 | 6.9561 | | |
| 39 | −55.4034 | 1.3000 | 1.48749 | 70.44 |
| 40 | 29.6386 | 0.0100 | 1.56732 | 42.84 |
| 41 | 29.6386 | 5.9000 | 1.72047 | 34.71 |
| 42 | −175.0744 | D(42) | | |
| 43 | 0.0000 | 2.0000 | 1.51680 | 64.20 |
| 44 | 0.0000 | 1.0000 | | |

Distances between the adjacent lens surfaces in several pairs in the fourth embodiment of the zoom lens are given in Table 11 below as well as varied values of the focal distance f, the F-number Fno, and the field angle ω for each of the photographing positions at the wide-angle position (f=152.1633), at the intermediate zooming state (f=297.4851), and at the telephoto position (f=582.52), respectively.

TABLE 11

| f | 152.1633 | 297.4851 | 582.5200 |
|---|---|---|---|
| Fno | 4.99224 | 5.87742 | 6.53711 |
| ω | 7.9436 | 4.07100 | 2.07820 |
| D(6) | 64.0000 | 111.2643 | 142.4400 |
| D(16) | 34.0551 | 23.2139 | 2.0400 |
| D(29) | 27.7980 | 17.1857 | 24.0639 |
| D(36) | 13.6386 | 8.2816 | 2.5000 |
| D(42) | 51.0000 | 77.8106 | 97.8880 |

Distances between the adjacent lens surfaces in several pairs in the fourth embodiment of the zoom lens during focusing on an object at the near point for photographing situation at the wide-angle position (f=152.1633), at the intermediate zooming state (f=297.4851), and at the telephoto position (f=582.52), respectively, are given in Table 12 below as well as varied values of the focal length f upon focusing on an object at infinite distance away and the distance D(0) from the front surface of the first lens piece to the object.

TABLE 12

| f | 152.1633 | 297.4851 | 582.5200 |
|---|---|---|---|
| D(0) | 2399.28 | 2352.02 | 2320.84 |
| D(29) | 26.1916 | 13.2535 | 12.8804 |
| D(36) | 15.2450 | 12.2138 | 13.6835 |

Embodiment 5

Figure 17:
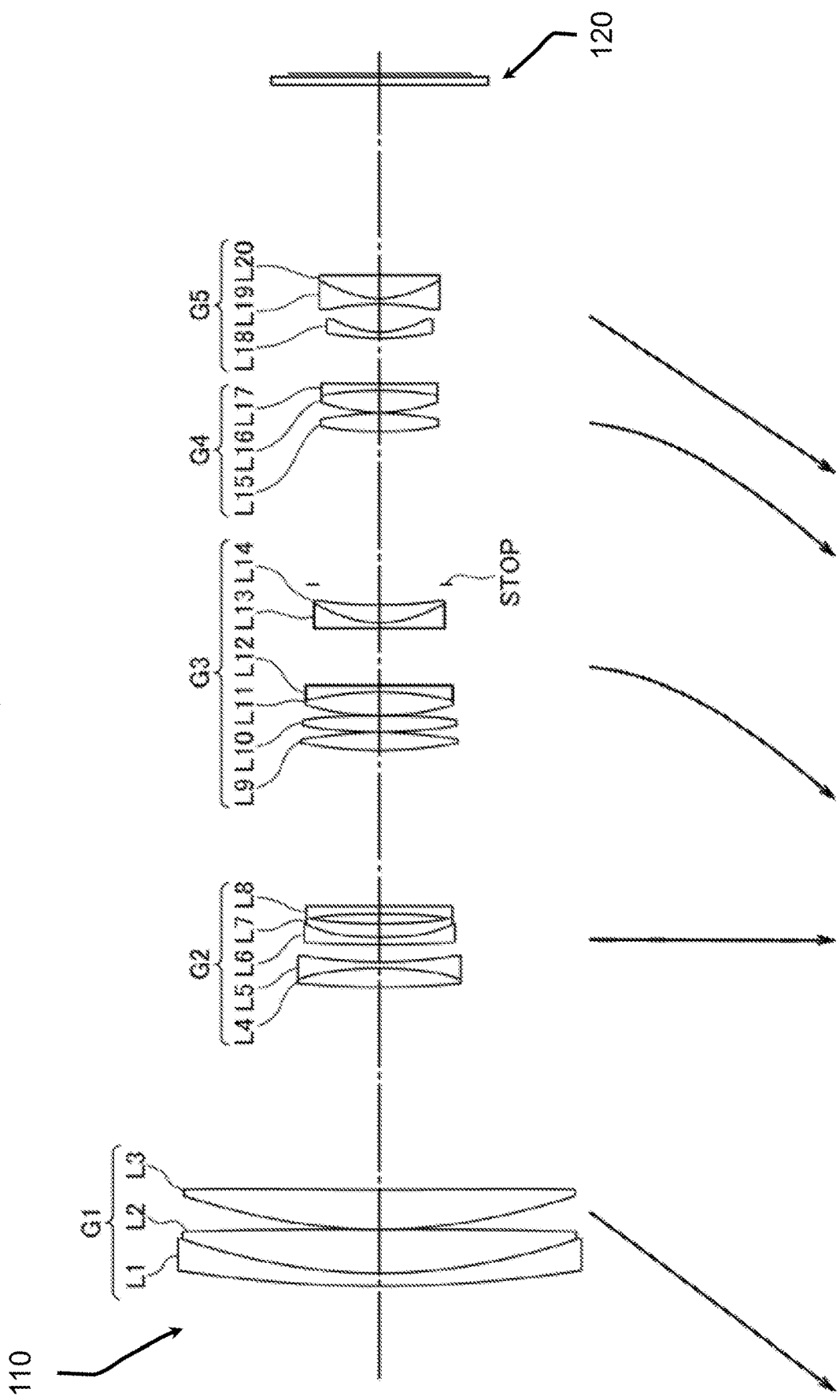
FIG. 17 is a vertical sectional view showing a fifth embodiment of the zoom lens according to the present invention when the zoom lens is taking a wide-angle position.
Figure 18:
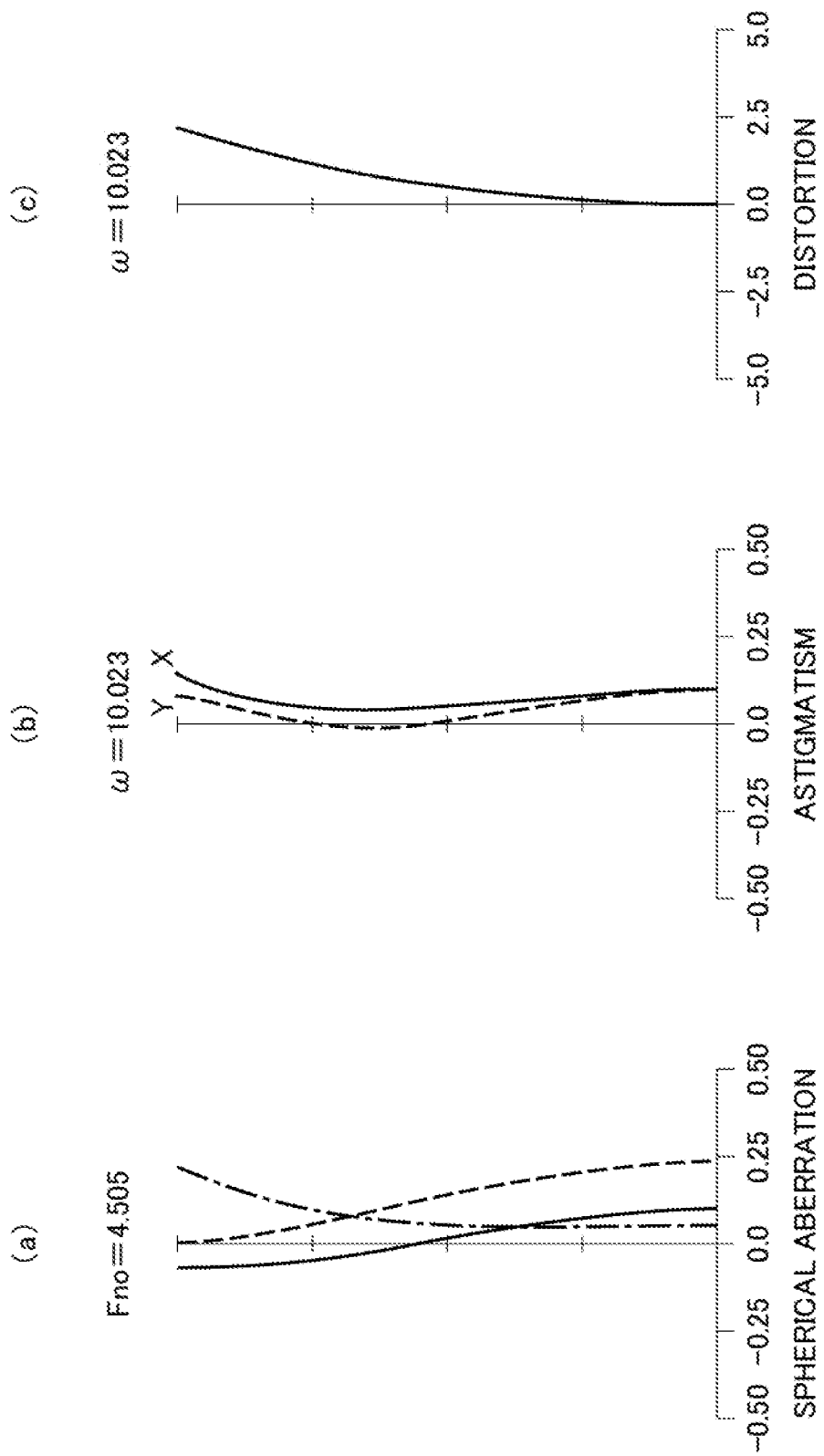
FIG. 18 depicts graphs of spherical aberration, astigmatism, and distortion aberration developed in the fifth embodiment of the zoom lens when the zoom lens taking a wide-angle position is in focus at a point at infinity.
Figure 19:
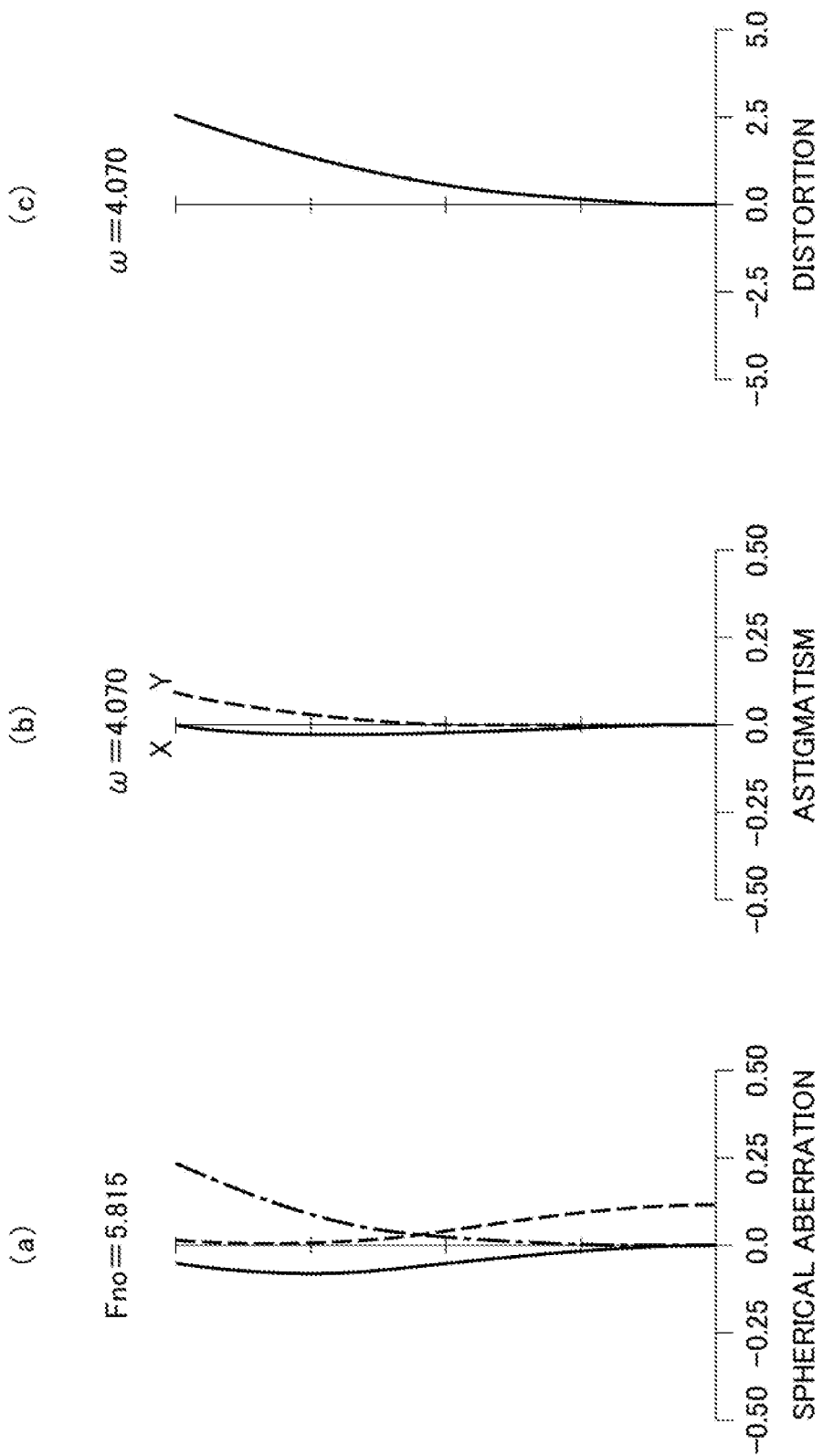
FIG. 19 depicts graphs of spherical aberration, astigmatism, and distortion aberration developed in the fifth embodiment of the zoom lens when the zoom lens taking a position in the intermediate zooming state is in focus at a point at infinity.
Figure 20:
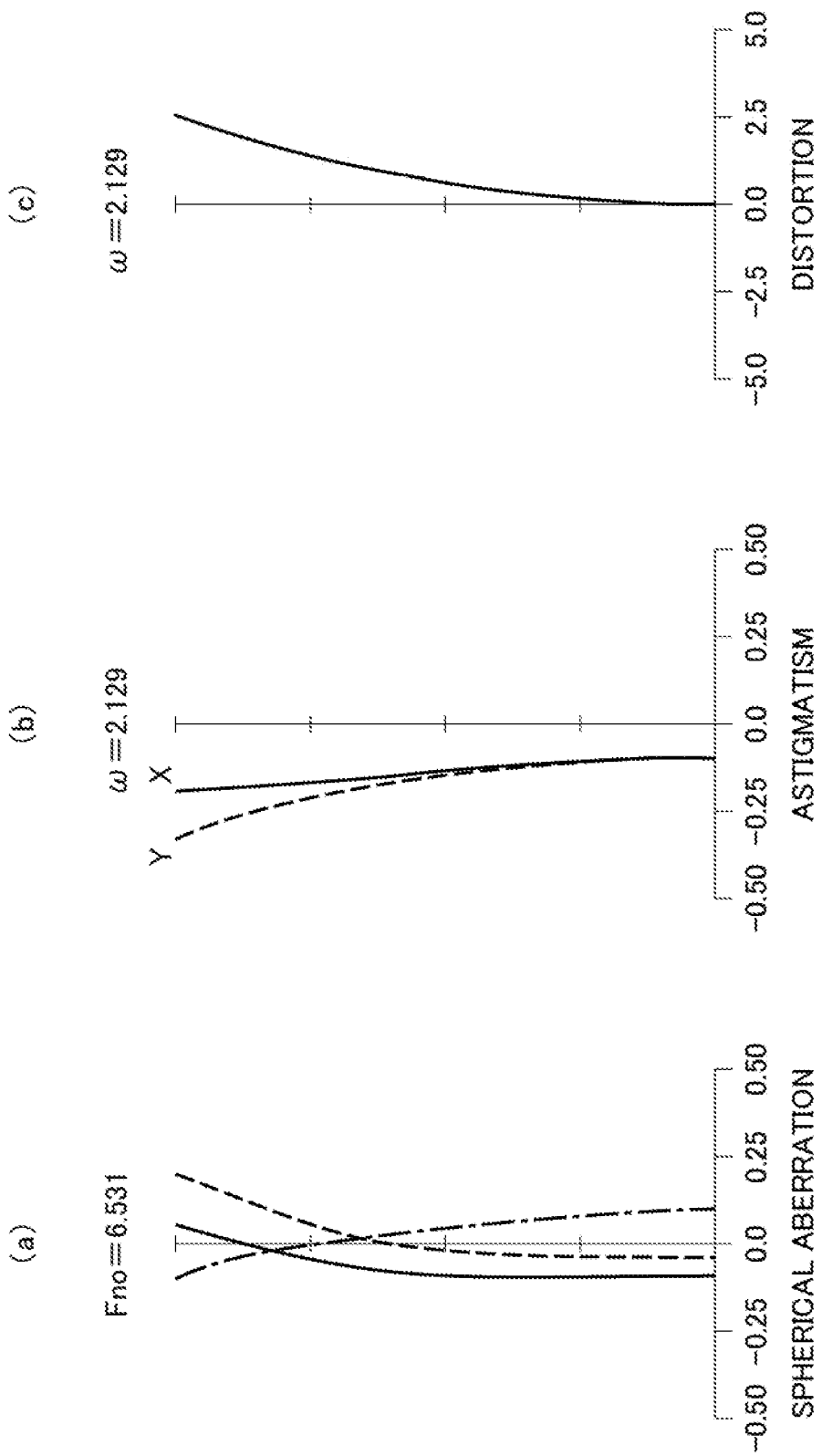
FIG. 20 depicts graphs of spherical aberration, astigmatism, and distortion aberration developed in the fifth embodiment of the zoom lens when the zoom lens taking a telephoto position is in focus at a point at infinity.

FIG. 17 is a vertical sectional view showing a lens arrangement of a fifth embodiment of the zoom lens according to the present invention. The fifth embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

In the fifth embodiment of the zoom lens, the first lens group G1 comprises a duplet of a meniscus lens piece L1 of negative refractive power with its convex surface oriented to the object and a lens piece L2 of positive refractive power cemented with the meniscus lens piece L1, and a meniscus lens piece L3 of positive refractive power with its convex surface oriented toward the object, all the lens pieces being arranged in this order from the closest to the object in the foremost position to the farthest from the object in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a biconvex lens piece L11 and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a biconvex lens piece L16 and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a biconvex lens piece L20 cemented with the lens piece L19, all the lens pieces being arranged in this order on the basis of the foremost first.

During shifting from the wide-angle position to the telephoto position to vary magnification, the fifth embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the fifth embodiment of the zoom lens are provided in Table 13.

TABLE 13

| NS | R | D | Nd | vd |
| --- | --- | --- | --- | --- |
| 1 | 343.2915 | 3.0000 | 1.83400 | 37.34 |
| 2 | 145.9091 | 0.0200 | 1.56732 | 42.84 |
| 3 | 145.9091 | 10.0500 | 1.49700 | 81.61 |
| 4 | −1465.0143 | 0.3000 | | |
| 5 | 146.8570 | 9.3000 | 1.49700 | 81.61 |
| 6 | −2192.2330 | D(6) | | |
| 7 | 247.8836 | 4.5000 | 1.80518 | 25.46 |
| 8 | −60.9978 | 0.0100 | 1.56732 | 42.84 |
| 9 | −60.9978 | 1.6000 | 1.75243 | 49.57 |
| 10 | 122.8808 | 3.5590 | | |
| 11 | −3272.8176 | 1.5000 | 1.83888 | 39.37 |
| 12 | 44.9185 | 0.0100 | 1.56732 | 42.84 |
| 13 | 44.9185 | 3.5140 | 1.80518 | 25.46 |
| 14 | 172.9348 | 2.7259 | | |
| 15 | −65.8855 | 1.5000 | 1.90366 | 31.31 |
| 16 | −8818.9517 | D(16) | | |
| 17 | 107.5605 | 4.2567 | 1.49700 | 81.61 |

TABLE 13-continued

| NS | R | D | Nd | vd |
| --- | --- | --- | --- | --- |
| 18 | −82.4101 | 0.2000 | | |
| 19 | 131.8612 | 3.5227 | 1.48749 | 70.44 |
| 20 | −137.2545 | 0.2000 | | |
| 21 | 74.0878 | 5.3399 | 1.48749 | 70.44 |
| 22 | −69.9110 | 0.0100 | 1.56732 | 42.84 |
| 23 | −69.9110 | 1.5000 | 1.90366 | 31.31 |
| 24 | −2310.5069 | 13.5458 | | |
| 25 | −220.8383 | 1.2000 | 1.71680 | 45.46 |
| 26 | 29.9133 | 0.0100 | 1.56732 | 42.84 |
| 27 | 29.9133 | 4.1500 | 1.80610 | 33.27 |
| 28 | 95.4308 | 5.0000 | | |
| 29 STOP | 0.0000 | D(29) | | |
| 30 | 80.8865 | 4.1200 | 1.50860 | 59.40 |
| 31 | −64.5149 | 0.2000 | | |
| 32 | 37.7400 | 5.4200 | 1.50623 | 60.42 |
| 33 | −57.0230 | 0.0100 | 1.56732 | 42.84 |
| 34 | −57.0230 | 1.3000 | 1.90366 | 31.31 |
| 35 | 797.3134 | D(35) | | |
| 36 | 94.7210 | 1.3000 | 1.82563 | 41.77 |
| 37 | 24.4742 | 6.4000 | | |
| 38 | −55.8634 | 1.3000 | 1.48749 | 70.44 |
| 39 | 25.9416 | 0.0100 | 1.56732 | 42.84 |
| 40 | 25.9416 | 5.6800 | 1.65673 | 32.70 |
| 41 | −226.3658 | D(41) | | |
| 42 | 0.0000 | 2.0000 | 1.51680 | 64.20 |
| 43 | 0.0000 | 1.0000 | | |

Distances between the adjacent lens surfaces in several pairs in the fifth embodiment of the zoom lens are given in Table 14 below as well as varied values of the focal distance f, the F-number Fno, and the field angle ω for each of the photographing positions at the wide-angle position (f=122.40), at the intermediate zooming state (f=304.04), and at the telephoto position (f=582.00), respectively.

TABLE 14

| f | 122.4004 | 304.0417 | 582.0046 |
| --- | --- | --- | --- |
| Fno | 4.5047 | 5.8152 | 6.5310 |
| ω | 10.023 | 4.070 | 2.129 |
| D(6) | 46.8750 | 111.4683 | 141.3470 |
| D(16) | 36.4322 | 21.0752 | 2.0150 |
| D(29) | 35.2507 | 19.3740 | 24.5725 |
| D(35) | 10.8554 | 6.7810 | 3.9750 |
| D(41) | 43.9427 | 79.2508 | 95.9185 |

Distances between the adjacent lens surfaces in several pairs in the fifth embodiment of the zoom lens during focusing on an object at the near point for photographing situation at the wide-angle position (f=122.40), at the intermediate zooming state (f=304.04), and at the telephoto position (f=582.00), respectively, are given in Table 15 below as well as varied values of the focal length f upon focusing on an object at infinite distance away and the distance D(0) from the front surface of the first lens piece to the object.

TABLE 15

| f | 122.4004 | 304.04 | 582.00 |
| --- | --- | --- | --- |
| D(0) | 2217.380 | 2152.787 | 2122.908 |
| D(29) | 34.11145 | 15.72925 | 14.53497 |
| D(35) | 11.99467 | 10.42577 | 14.01258 |

The values of the terms in the formulae (1) to (5) regarding the first to fifth embodiments of the present invention are given in Table 16 below:

TABLE 16

| Embodiment | 1 | 2 | 3 | 4 | 5 |
|---|---|---|---|---|---|
| X1/fT - formula (1) | 0.1336 | 0.1326 | 0.1335 | 0.1347 | 0.1623 |
| f1/√(fw · fT) - formula (2) | 0.7965 | 0.8312 | 0.8788 | 0.8265 | 0.9242 |
| f3/√(fw · fT) - formula (3) | 0.3005 | 0.2462 | 0.2541 | 0.2665 | 0.2616 |
| $(1 - \beta a) \cdot \beta b$ - formula (4) | −1.2043 | −1.5548 | −1.2205 | −1.4781 | −1.4517 |
| Lt/fT - formula (5) | 0.6207 | 0.6457 | 0.7213 | 0.6509 | 0.6479 |

We claim:

1. A zoom lens comprising at least three groups of lens pieces comprising in order from the object side a first lens group having refractive power, a second lens group having refractive power, and a third lens group having refractive power and movable to vary magnification, and
   wherein one of:
   a lens block is included in the third lens group, the lens block included in the third lens group having at least one lens piece and negative refractive power and being movable in directions normal to the optical axis to serve as an anti-vibration lens for shifting an image;
   one lens group is included behind the third lens group, the one lens group behind the third lens group having negative refractive power and being movable in directions normal to the optical axis to serve as an anti-vibration lens for shifting an image; and
   a lens block is included in a lens group behind the third lens group, the lens block included in a lens group behind the third lens group having at least one lens piece and negative refractive power and being movable in directions normal to the optical axis to serve as an anti-vibration lens for shifting an image; and
   wherein the zoom lens meets the following formulae:

$$0.11 \leq X1/fT \leq 0.28 \tag{1}$$

$$0.20 \leq f3/\sqrt{(fw \times fT)} \leq 0.3005 \tag{3}$$

$$0.60 \leq Lt/fT \leq 0.75 \tag{5}$$

where X1 is a displacement of the first lens group when the zoom lens is extended from a wide-angle end to a telephoto end to vary magnification, fw is a focal length of the zoom lens at the wide-angle end, fT is a focal length of the zoom lens at the telephoto end, f3 is a focal length of the third lens group, and Lt is an entire length of the optical system of the zoom lens at the telephoto end.

2. The zoom lens according to claim 1, wherein the zoom lens comprises at least one of:
   at least one lens block or group of positive refractive power located adjacent to the object via a space and closer to the object than all or part of the lens group or lens block of negative refractive power moved to serve as an anti-vibration lens for shifting an image and
   at least one component lens piece of positive refractive power located adjacent to the object via a space closer to the object than all or part of the lens group or lens block of negative refractive power moved to serve as an anti-vibration lens for shifting an image.

3. The zoom lens according to claim 1, wherein at least one lens group having a negative refractive power behind the second lens group has one or more lens pieces of positive and negative refractive power.

4. The zoom lens according to claim 1, wherein part or all of the lens group(s) moved to serve as an anti-vibration lens for shifting an image meet the requirements as defined in the following formula (4):

$$-2.8 \leq (1-\beta a) \times \beta b \leq -1.0 \tag{4}$$

where $\beta a$ is a magnification of the lens group(s) movable in directions normal to the optical axis when the zoom lens is taking a posture of the telephoto end, and $\beta b$ is a combined magnification of a lens group(s) closer to the imaging plane than the lens group(s) movable in directions normal to the optical axis.

5. The zoom lens according to claim 1, wherein the zoom lens has two or more lens groups located behind the third lens group and moved to vary magnification.

6. A camera device comprising image sensors disposed on or behind the imaging plane of the zoom lenses according to claim 1, for converting an optical image created by the zoom lens into electrical signals.

7. A zoom lens comprising in order from the object side at least a foremost, first lens group having refractive power, a succeeding second lens group having refractive power, a third lens group having refractive power, a fourth lens group having refractive power, and a fifth lens group having refractive power, wherein the distances between the first and second lens groups, between the second and third lens groups, between the third and fourth lens groups, and between the fourth and fifth lens groups change when zooming, and
   wherein one of:
   a lens block is included in one of the third lens group, the fourth lens group, and the fifth lens group, the lens block having at least one lens piece and negative refractive power and being movable in directions normal to the optical axis to serve as an anti-vibration lens for shifting an image;
   the fourth lens group has negative refractive power and is movable in directions normal to the optical axis to serve as an anti-vibration lens for shifting an image; and
   the fifth lens group has negative refractive power and is movable in directions normal to the optical axis to serve as an anti-vibration lens for shifting an image;
   wherein a lens piece located closer to the object than all or part of the anti-vibration lens is adjacent to the anti-vibration lens and has negative power; and
   wherein the zoom lens meets the requirements as defined in the following formulae:

$$0.11 \leq X1/fT \leq 0.28 \tag{1}$$

$$0.20 \leq f3/\sqrt{(fw \times fT)} \leq 0.3005 \tag{3}$$

$$0.60 \leq Lt/fT \leq 0.75 \tag{5}$$

where X1 is a displacement of the first lens group when the zoom lens is extended from the wide-angle end to the telephoto end to vary magnification, fw is a focal length of the zoom lens at the wide-angle end, fT is a focal length of the zoom lens at the telephoto end, f3 is a focal length of the third lens group, and Lt is an entire length of the optical system of the zoom lens at the telephoto end.

8. The zoom lens according to claim 7, wherein the zoom lens comprises at least one of:
  at least one lens group of positive refractive power and
  at least one component lens piece of positive refractive power located closer to the object than at least part of at least one of the lens groups of negative refractive power moved to serve as an anti-vibration lens for shifting an image.

9. The zoom lens according to claim 7, wherein the zoom lens has one or more lens pieces of positive and negative refractive power in at least part of at least one of the lens groups of negative refractive power moved to serve as an anti-vibration lens for shifting an image.

10. The zoom lens according to claim 7, wherein part or all of the lens group(s) moved to serve as an anti-vibration lens for shifting an image meet the requirements as defined in the following formula (4):

$$-2.8 \leq (1-\beta a) \times \beta b \leq -1.0 \tag{4}$$

where $\beta a$ is a magnification of the lens group(s) movable in directions normal to the optical axis when the zoom lens is taking a posture of the telephoto end, and $\beta b$ is a combined magnification of a lens group(s) closer to the imaging plane than the lens group(s) movable in directions normal to the optical axis.

11. The zoom lens according to claim 7, wherein the zoom lens has two or more lens groups located behind the third lens group and moved to vary magnification.

12. A camera device comprising image sensors disposed on or behind the imaging plane of the zoom lenses according to claim 7, for converting an optical image created by the zoom lens into electrical signals.

* * * * *